(12) United States Patent
Poddar et al.

(10) Patent No.: US 10,430,423 B1
(45) Date of Patent: Oct. 1, 2019

(54) ATTRIBUTE TRANSLATION AND MATCHING FROM A PLURALITY OF DATA RECORDS TO CREATE CONSOLIDATED DATA RECORDS

(71) Applicant: priceline.com LLC, Norwalk, CT (US)

(72) Inventors: Amit Poddar, Stamford, CT (US); Michael Diliberto, New Canaan, CT (US); John Caine, Bridgeport, CT (US); Jim Chen, Danbury, CT (US); Will Homes, Norwalk, CT (US); Nasreen Ali, Norwalk, CT (US); Murali Gadde, Norwalk, CA (US); Ian Merritt, Norwalk, CT (US); Ronald Henderson, Norwalk, CT (US); Christine Wong, Norwalk, CT (US)

(73) Assignee: priceline.com LLC, Norwalk, CA (US)

( * ) Notice: Subject to any disclaimer, the term of this patent is extended or adjusted under 35 U.S.C. 154(b) by 683 days.

(21) Appl. No.: 15/002,273

(22) Filed: Jan. 20, 2016

Related U.S. Application Data

(60) Provisional application No. 62/199,870, filed on Jul. 31, 2015.

(51) Int. Cl.
*G06F 17/30* (2006.01)
*G06F 7/00* (2006.01)
*G06F 16/2457* (2019.01)
*G06F 16/951* (2019.01)

(52) U.S. Cl.
CPC ...... *G06F 16/24578* (2019.01); *G06F 16/951* (2019.01)

(58) Field of Classification Search
USPC ........................................................ 707/728
See application file for complete search history.

(56) References Cited

U.S. PATENT DOCUMENTS

| | | | | |
|---|---|---|---|---|
| 6,523,041 | B1 * | 2/2003 | Morgan | G06Q 30/02 707/E17.005 |
| 7,363,312 | B2 * | 4/2008 | Goldsack | G06F 16/24562 707/999.1 |
| 7,673,327 | B1 * | 3/2010 | Polis | G06F 21/6236 726/5 |
| 7,849,219 | B2 * | 12/2010 | Rose | H04L 67/327 709/201 |
| 7,966,291 | B1 * | 6/2011 | Petrovic | G06F 16/951 707/641 |
| 8,290,803 | B2 * | 10/2012 | Barrett | G06Q 20/108 705/7.12 |
| 8,429,098 | B1 * | 4/2013 | Pawar | G06F 16/215 706/12 |

(Continued)

*Primary Examiner* — Pavan Mamillapalli
(74) *Attorney, Agent, or Firm* — Elliot H. Karlin; Hickman Palermo Becker Bingham LLP

(57) ABSTRACT

A system and method for translating and matching attributes in data records that describe travel items is provided. In an embodiment, a plurality of records is received from a plurality of data sources. Record parsing logic is used divide strings in the records into individual words and match single words in the plurality of records to attributes. Using the matched attributes, record comparison logic creates a confidence score that describes the likelihood that two records describe the same listing or inventory item. If the confidence score exceeds a given threshold, the records are determined to match. A consolidated record is then created from the two matched records.

26 Claims, 7 Drawing Sheets

(56) References Cited

U.S. PATENT DOCUMENTS

| | | | | |
|---|---|---|---|---|
| 9,858,628 | B2 * | 1/2018 | Corbett | G06F 16/215 |
| 10,204,171 | B1 * | 2/2019 | Schachter | G06Q 50/02 |
| 2002/0065739 | A1 * | 5/2002 | Florance | G06Q 30/06 |
| | | | | 705/26.43 |
| 2003/0225780 | A1 * | 12/2003 | Adams | G06F 16/2456 |
| | | | | 707/999.102 |
| 2011/0029336 | A1 * | 2/2011 | Vieillard-Baron | |
| | | | | G06Q 10/025 |
| | | | | 705/6 |
| 2012/0209837 | A1 * | 8/2012 | Hintze | G06Q 50/16 |
| | | | | 707/725 |
| 2012/0253963 | A1 * | 10/2012 | Becker | G06Q 10/02 |
| | | | | 705/26.2 |
| 2012/0311431 | A1 * | 12/2012 | Breaker | G06Q 30/06 |
| | | | | 715/234 |
| 2016/0267610 | A1 * | 9/2016 | Corbett | G06Q 50/163 |

* cited by examiner

ATTRIBUTE TRANSLATION AND MATCHING FROM A PLURALITY OF DATA RECORDS TO CREATE CONSOLIDATED DATA RECORDS

RELATED APPLICATION DATA AND CLAIM OF PRIORITY

This application claims the benefit of U.S. Provisional Application No. 62/199,870 entitled "Attribute Translation and Matching from a Plurality of Data Records to Create Consolidated Data Records", filed Jul. 31, 2015, the contents of which are incorporated by reference for all purposes as if fully set forth herein.

FIELD OF THE DISCLOSURE

The present disclosure relates to computers that are configured to retrieve records through application programming interfaces of a plurality of data sources, determine that a plurality of records describe the same inventory item, and consolidate the records for display through a graphical user interface.

BACKGROUND

The approaches described in this section are approaches that could be pursued, but not necessarily approaches that have been previously conceived or pursued. Therefore, unless otherwise indicated, it should not be assumed that any of the approaches described in this section qualify as prior art merely by virtue of their inclusion in this section.

The modern prevalence of travel booking websites has created a large amount of information that is available to consumers. In the context of travel items, such as hotel rooms, airplane flights, and vacation packages, service providers who own or operate travel websites may negotiate directly with the travel service provider to create an offering for the public. For example, one company may negotiate a price of $100 a night for a room while a second company may negotiate a price of $120 a night for the same room. The travel websites may display the negotiated prices, payment options, and other information about the listings on their individual websites.

The large amount of information available to customers may be overwhelming. With multiple websites available, each of which displaying booking information for multiple listings or inventory items, it is difficult for an end user to compare listings. The difficulty for the end user to reasonably compare listings negotiated by various travel websites has led to the creation of websites that consolidate listings from multiple data sources. The consolidated websites may receive information from each data source regarding availability of listings, number of listings, and rates for each listing. The consolidated websites may then display the various listings on a single site, allowing a user to compare information received from multiple data sources.

One issue with displaying comparative information received from multiple data sources is the difficulty in determining whether the data sources are describing the same or different listings. As an example, a hotel booking website may receive hotel data from multiple sources. Each data source may use different data structures to describe a hotel room. While one may include fields for "amenities," "beds," and "size," another listing may include all of the information in a "description" section. Additionally, there is no general uniformity between data sources, such as unique identifiers that can be used to match room listings. Each website may have its own unique identifier for identifying a listing, but the identifiers will likely not match across data sources.

An additional issue with displaying comparative information is ensuring high quality data is displayed to a consumer. Some data sources may display higher quality data than others. For example, a first hotel booking website may display a listing that contains photographs of the hotel, photographs of the room, all amenities provided by the hotel, all amenities provided for the single room, and detailed descriptions of the room. A second data source may describe the same room with only basic information, such as availability, rate, and number of beds. The difference in descriptions may stem from choices made by the data sources or from the information made available to each data source. For example, a hotel room may release photographs of the rooms to one data source, but not to a second data source.

Another issue with displaying comparative information is that information displayed by some websites may be cryptic or difficult to understand. For example, a data source may describe a property with the phrase "36 ft balcony with kngbd" to identify a room with a king-size bed. Consumers may be confused by various types of description, especially when the descriptions describe the same property but use different language to do so.

From the perspective of a consumer, it becomes difficult to make an informed decision even when all of the information is available on the same website. To be able to compare listings, the consumer would first need to figure out if the listings are discussing the same inventory item, or hotel room. The difficulty for the consumer is compounded by the fact that each data source describes the property using different terms and provides different levels of information.

Therefore, there is a need for a system that identifies listings that describe the same listings or inventory items and provides consumers with high quality consolidated information for each listing or inventory item based on data received from each data source.

SUMMARY

The appended claims may serve as a summary of the disclosure.

DETAILED DESCRIPTION

Figure 1:
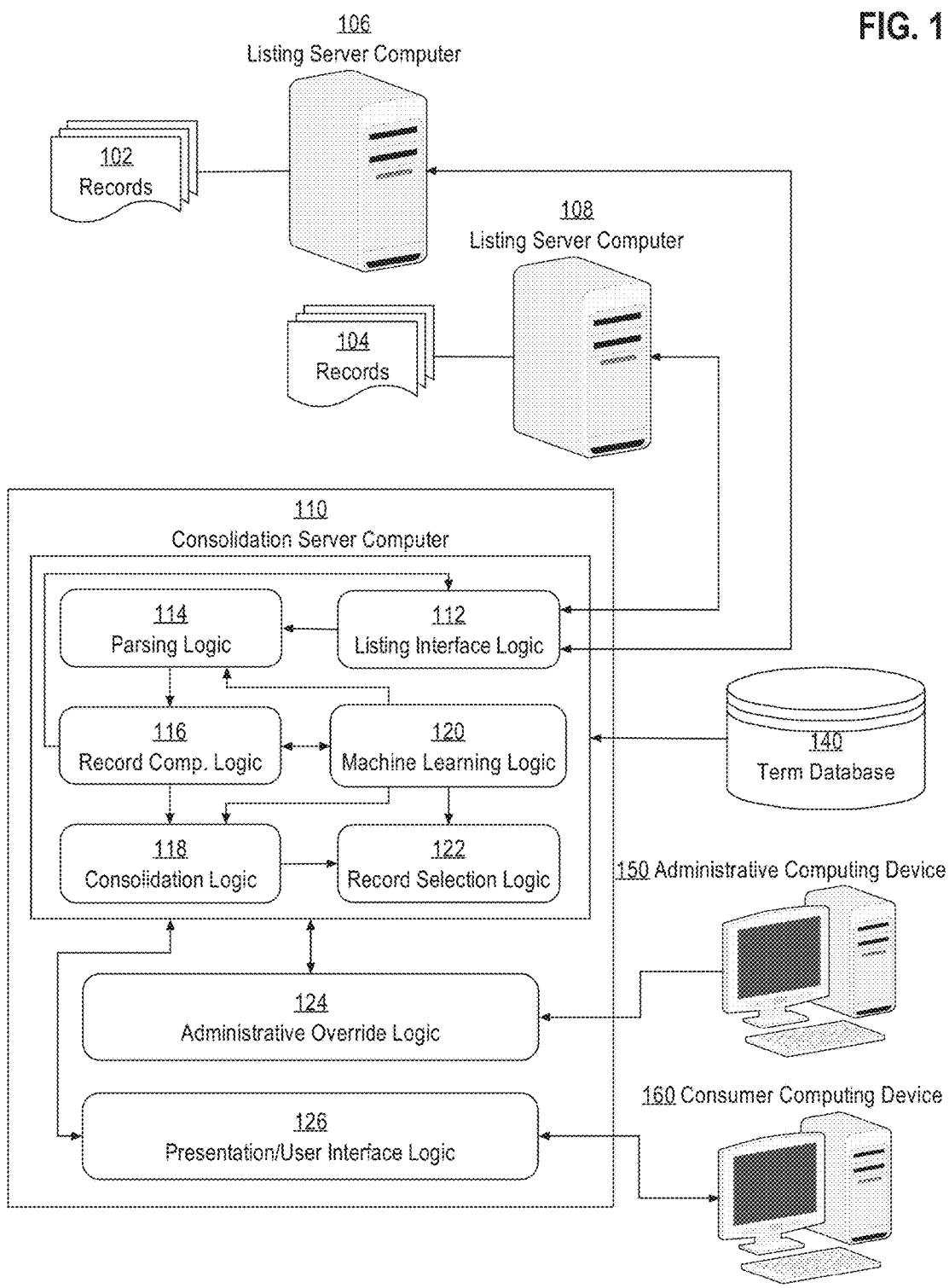
FIG. 1 illustrates an example computer system that is configured or programmed to match and consolidate data records received from a plurality of data sources.

In the following description, for the purposes of explanation, numerous specific details are set forth in order to provide a thorough understanding of the present disclosure. It will be apparent, however, that embodiments may be practiced without these specific details. In other instances, well-known structures and devices are shown in block diagram form in order to avoid unnecessarily obscuring the present disclosure. The description is provided according to the following outline:

General Overview
Structural Overview
Record Matching
   Attribute Translation
   Confidence Scores
   Additional Information Requests
   Automatic Overrides
   Manual Overrides
Record Consolidation
Record Selection
Alternative Selection
Machine Learning
Hardware Overview
General Overview Aspects of the disclosure generally relate to computer-implemented techniques for identifying matching data records based on information within the data records and consolidating the data records into a single listing. In an embodiment, a consolidation server computer receives records from a plurality of listing server computers. The listing server computers act as provider computers to customers and data sources the consolidation server computer. The consolidation server computer parses the data records into attributes, compares attributes from records received by different listing server computers, and creates a confidence score that the records describe the same listing. The consolidation server computer may then consolidate the records into one or more listings. In an embodiment, the consolidation server computer translates attributes using a term database. Manual and automatic overrides may be implemented to ensure that only records describing the same listing are consolidated into a single listing.

In an embodiment, a data processing method comprises receiving, from a first provider computing device of a plurality of different provider computing devices, a first record containing a first plurality of attributes that at least partly describe a particular travel item; receiving, from a second provider computing device of the plurality of different provider computing devices, a second record containing a second plurality of attributes; using digitally programmed logic of a server computing device, determining that the first record and the second record describe the same particular travel item by: extracting the first plurality of attributes from the first record and extracting the second plurality of attributes from the second record; identifying a first set of attributes of the first plurality of attributes that corresponds to a second set of attributes of the second plurality of attributes, wherein at least a portion of the first set of attributes is different than at least a portion of the second set of attributes but at least partially describes a same particular feature of the particular travel item; creating and storing a confidence score based, at least in part, on identifying the first set of attributes that corresponds to the second set of attributes; determining that the confidence score exceeds a threshold value; only when the confidence score exceeds the threshold value, creating one or more consolidated records by merging the first plurality of attributes and the second plurality of attributes and using the one or more consolidated records in operations relating to booking the particular travel item in response to communications with a user terminal.

Other features and aspects of the disclosure will become apparent in the drawings, description, and the claims.

Structural Overview

FIG. 1 illustrates an example computer system that is configured or programmed to match and consolidate data records received from a plurality of data sources.

In an embodiment, consolidation server computer 110 contains listing interface logic 112, parsing logic 113, record comparison logic 116, consolidation logic 118, machine learning logic 120, record selection logic 122, administrative override logic 124, and presentation/user interface logic 126. "Logic," as used in FIG. 1, refers in at least one embodiment to regions of main memory in the consolidation server computer 110 into which programmed, executable instructions have been loaded, and which instructions are configured when executed to cause the computer to perform the functions that are described herein for that logical element. For example, interface logic 112 indicates a region of main memory into which the computer has loaded instructions which when executed cause performing the interface functions that are further described herein. These elements of FIG. 1 also indirectly indicate how a typical programmer or software engineer would organize the source code of programs that implement the functions that are described; the code may be organized into logical modules, methods, subroutines, branches, or other units using an architecture corresponding to FIG. 1.

Consolidation server computer 110 may also include other devices, components, or elements of a computer system such as volatile or non-volatile memory, non-volatile storage such as disk, and I/O devices or interfaces.

Administrative computing device 150 and consumer computing device 160 may be any of a laptop, netbook, personal computer, workstation, smartphone, tablet, PDA, or other computing devices associated with an administrator of consolidation server computer 110 and a customer of consolidation server computer 110 respectively. Consolidation server computer 110, listing server computer 106 and listing server computer 108 may each be a server-class computer or multiple computers in a data center. Consolidation server computer 110 may be communicatively coupled directly or indirectly via one or more networks, such as local area networks or wide area networks, or internetworks with listing server computer 106, listing server computer 108, term database 140, administrative computing device 150, and consumer computing device 160.

In an embodiment, listing interface logic 112 is programmed or configured to communicate over a network with listing server computer 106 and listing server computer 108 to receive records 102 and records 104. For example, listing interface logic 112 may be programmed or configured to make calls to the application program interfaces (APIs) of web services applications hosted by listing server computer 106 and listing server computer 108. Listing interface logic 112 may be further configured to label records 102 and records 104 based on a listing server computer of origin and provide records 102 and records 104 to parsing logic 114.

In an embodiment, parsing logic 114 is programmed or configured to perform string parsing actions. For example, parsing logic 114 may be programmed or configured to break each of records 102 and records 104 into a series of strings. Parsing logic 114 may further break each string into delimited words or numbers. Additionally, parsing logic 114 may create values that describe carriage returns, changes in font, headings, or other location specific elements, and store the values in relation to each of the parsed strings. In an embodiment, parsing logic 114 may apply information received from term database 140 to translate attributes from a first record into the same form as attributes from a second record.

Record comparison logic 116 may be programmed or configured to compare attributes within two or more records and create a confidence score that describes a probability that the two or more records describe the same listing. Record comparison logic 116 may comprise a pattern recognition engine that determines a probability that two parsed strings describe the same element. In an embodiment, record comparison logic 116 applies provider specific rules to attributes when determining whether two or more attributes match. In some embodiments, record comparison logic 116 also applies override logic to alter a determination that two records match when one or more attributes contain a large variation.

In an embodiment, consolidation logic 118 is programmed or configured to create consolidated records from records 102 and records 104. Consolidation logic 118 may be programmed to select data attributes from one record to include in the consolidated records based on one or more consolidation rules. For example, consolidation logic 118 may be programmed or configured to use data attributes from a first record that was received by a provider with a history of accuracy. In some embodiments, consolidation logic 118 uses translated data attributes created by parsing logic 114 to create the attributes for the consolidated records. In further embodiments, consolidation logic 118 adds attributes that exist in one data record that do not exist in the matching data record to the translated attributes. In further embodiments, consolidation logic 118 is programmed or configured to display attributes that differ between the two matched records as separate listings. In other embodiments, consolidation logic 118 combines differing attributes into the same record or suppresses attributes from one record if they differ from other matching records.

In an embodiment, machine learning logic 120 may be programmed or configured to make changes to one or more rules provided to parsing logic 114, record comparison logic 116, consolidation logic 118, and record selection logic 122. Machine learning logic 120 may be configured to make the changes to the one or more rules in response to receiving one or more indications that two matched records do not actually describe the same listing or that two or more strings do not actually describe the same attribute. For example, machine learning logic 120 may be configured or programmed to recognize when administrative override logic 124 disassociates two or more matched records and store information indicating that the two matched records were disassociated. Machine learning logic 120 may determine one or more patterns based on multiple entries of disassociation and update parsing logic 114, record comparison logic 116, consolidation logic 118, and record selection logic 122.

In an embodiment, record selection logic 122 may be programmed or configured to determine one or more consolidated records to display based on one or more rules. Additionally, record selection logic 122 may be further configured to determine an order in which to display records based on one or more rules. For example, record selection logic 122 may contain a rule that gives priority to records with specific payment options if all other payment features, such as price, parking, and other payment factors, are equal. In some embodiments, record selection logic 122 may contain rules that give priority to records received from particular data sources.

In an embodiment, parsing logic 114, parsing comparison logic 116, consolidation logic 118, machine learning logic 120, and record selection logic 122 may receive information from term database 140. Term database 140 may contain common locations for various attribute strings, provider specific locations for various attribute strings, common variations of specific attributes, provider specific variations of specific attributes, provider information such as provider reliability or booking success rates, and other data used to parse various strings, compare attributes, consolidate records, and select records to display.

Administrative override logic 124 may be programmed or configured to receive data from administrative computing device 150 and apply the received data to one or more rules or results of parsing logic 114, record comparison logic 116, consolidation logic 118, machine learning logic 120, and record selection logic 122. For example, administrative override logic 124 may be programmed or configured to disassociate matched records or character strings based on input received from administrative computing device 150.

Presentation/user interface logic 126 may be programmed or configured to provide a graphical user interface to consumer computing device 160. For example, presentation/user interface logic 126 may be configured to generate a graphical user interface in the form of static or dynamic HTML pages that are delivered to and rendered by a browser hosted on consumer computing device 160. Additionally or alternatively, consumer computing device 160 may host a locally installed client application that interacts with the presentation layer of a server application system hosted at consolidation server computer 110.

Record Matching

Figure 2:
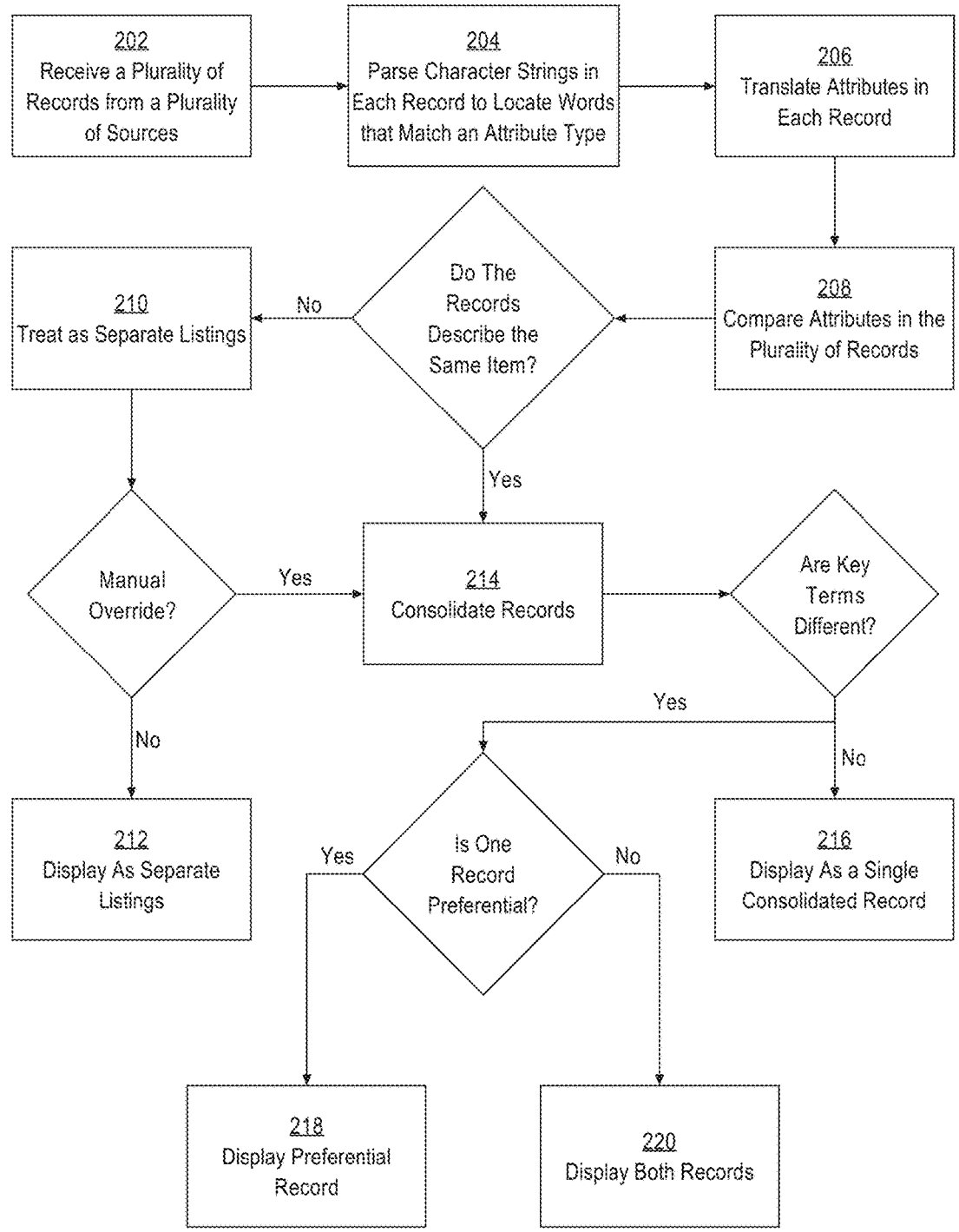
FIG. 2 illustrates a method or programming algorithm for matching and consolidating data records received from a plurality of data sources.

FIG. 2 illustrates a method or algorithm for matching and consolidating data records received from a plurality of data sources. FIG. 2, and each other method diagram or flow diagram in this disclosure, is intended to describe an algorithm, process or other outline for how the functions shown in the drawing figure may be implemented in programming instructions for a computer. Any suitable programming language or development environment may be used such as JAVA, OBJECTIVE-C, C++, scripting languages, and the like. In practice, an implementation or embodiment will include program instructions for many steps other than those shown in the drawing figures, but FIG. 2, and each other method diagram or flow diagram in this disclosure, nevertheless indicate the algorithmic information that the inventors have deemed sufficient to communicate to a skilled programmer or software engineer how to implement the specified functions in complete working code.

At step 202, a plurality of records is received from a plurality of sources. For example, consolidation server computer 110 may make calls to the APIs of web services applications hosted by listing server computer 106 and listing server computer 108 to request records 102 and records 104. In an embodiment, computer 106 and computer 108 are sources for hotel room data and each of records 102 and 104 pertain to hotel room availability. For example, listing server computer 106 may be a data repository that stores availability data for a plurality of different hotel rooms. As another example, listing server computer 108 may be a computing device associated with a company that negotiates hotel deals with a plurality of different hotels.

Figure 3:
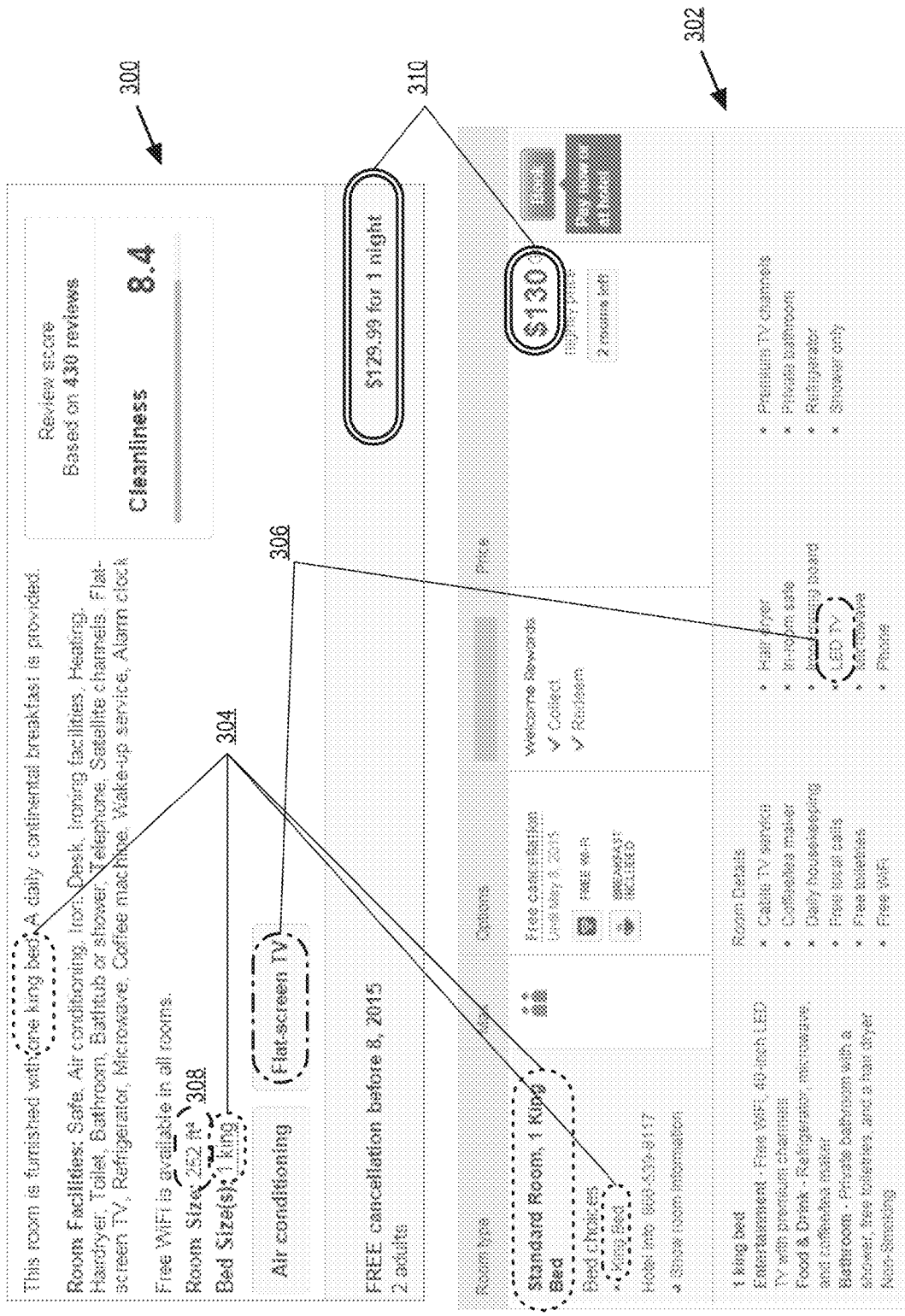
FIG. 3 depicts two records received from different data sources that describe the same listing.

Records received from two different data sources may use different language to describe the same listing. FIG. 3 depicts two records received from different data sources that describe the same listing. Listing 300 is a depiction of a description of a hotel room from a first data source. Listing 302 is a depiction of a description of the same hotel room from a second data source. Listing 300 and listing 302 contain matching hotel descriptors 304, corresponding hotel descriptors 306, and non-matching hotel descriptors 310. Additionally, listing 300 contains unique hotel descriptor 308.

In the embodiment depicted in FIG. 3, matching hotel descriptors 304 use the same language to describe the bed available at the hotel room. Both listing 300 and listing 302 use the phrase "King Bed." In contrast, listing 300 and listing 302 also contain corresponding hotel descriptors 306. Corresponding hotel descriptors 306 describe the same attribute using different language. For example, listing 300 describes the available television as "Flat-screen TV" while listing 302 describes the available television as "LED TV."

In an embodiment, a first record may contain attribute data that is not available in a second record describing the same listing. For example, listing 300 contains unique hotel descriptor 308. Unique hotel descriptor 308 describes the room size as "252 ft². " Listing 302 does not contain any attribute data relating to the size of the hotel room. Thus, not only does unique hotel descriptor 308 not match an attribute in listing 302, but listing 302 does not contain a corresponding attribute that could be compared to unique hotel descriptor 308.

Listing 300 and listing 302 may also contain non-matching hotel descriptors 310. Non-matching hotel descriptors 310 correspond to the same attribute, but contain different values. For example, non-matching hotel descriptors 310 of FIG. 3 contain different values for the price of the hotel room. Listing 300 quotes the hotel room at $129.99 a night while listing 302 quotes the hotel room at $130 a night. As various data sources negotiate hotel room prices independently, it is always possible for two records describing the same hotel room to contain varying prices. While the example in FIG. 3 only shows a price differential of a single penny, it is conceivable that a price differential for a single room may comprise higher values based on individual negotiations.

Referring again to FIG. 2, at step 204 character strings in each record are parsed to locate words that match an attribute type. For example, parsing logic 114 of consolidation server computer 110 may be used to parse strings in a record. In an embodiment, parsing the character strings includes breaking the character strings into delimited words. A software program may be used to separate words by recognizing spacing, carriage returns, and other symbols between the words.

In an embodiment, parsing the strings in a record includes locating strings that correspond to one or more attributes. For example, parsing logic 114 may access term database 140 to identify words in the record. In an embodiment, parsing logic 114 first searches for exact matches of individual words in term database 140. Term database 140 may indicate whether the individual words comprise an attribute on their own or whether other surrounding words are needed to create an attribute. For example, "refrigerator" may be listed as an individual attribute in term database 140. In contrast, the word "bed" may be listed as a portion of an attribute in term database 140.

In an embodiment, if parsing logic 114 determines that a word in a record comprises a portion of an attribute, then parsing logic 114 may combine the word with surrounding words and check the new strings against term database 140. In the "bed" example, if the term preceding "bed" is "king," parsing logic 114 may search for "king bed" in term database 140. In some embodiments, term database 140 indicates other words that may be combined with the first word to create an attribute. In the "bed" example, term database 140 may list options for surrounding words that include "king," "queen," "twin," and "full." Parsing logic 114 may then search the words surrounding "bed" for any of the options listed in term database 140. If a text string includes "Bed Size(s): 1 king," parsing logic 114 may locate the word "king" in close proximity to the word "bed" and consider the attribute to be "king bed."

In an embodiment, parsing strings in the record includes locating strings that indicate one or more attributes in close proximity. For example, term database 140 may indicate that the string "Room Type" should be located in close proximity to an attribute. Parsing logic 114 may be configured to search strings located in close proximity to the identified string for an attribute of a specific attribute type. In the "Room Type" example, parsing logic 114 may be configured to search for attributes of the 'room type' or 'bed type' categories. Parsing logic 114 may search for strings that match or are closely related to strings in term database 140 that fall under the 'room type' and 'bed type' categories.

In other embodiments, parsing strings includes searching term database 140 for terms that match parsed words. In an embodiment, after the records are parsed, parsing logic 114 accesses term database to search for matches to parsed words. In an example record containing "the room contains a king bed," parsing logic 114 may search term database 140 for the words "the," "room," "contains," "a," "king," and "bed." Term database may indicate that the words "king" and "bed" may correlate to attributes while the words "the," "room," "contains," and "a" likely do not correlate to attributes.

In some embodiments, parsing strings in the record includes using pattern matching logic to determine that strings are closely related to stored strings. For example, parsing logic 114 may locate the string "$130." Term database 140 may indicate that strings that match the pattern of "$_" likely correspond to a price for the hotel room. In some embodiments, term database includes additional requirements or factors to determine whether a term matches an attribute. For example, term database 140 may include an indication that a string corresponding to "night," "week," or "month," should be located within close proximity to strings that match the pattern of "$_". In some embodiments, the absence of the additional terms may cause parsing logic 114 to determine that there is not a match to an attribute value. In other embodiments, the absence of the additional terms causes parsing logic 114 to indicate that it is less likely that there is a match to an attribute value. For example, parsing logic 114 may create and store an attribute confidence score that indicates the likelihood that one or more strings correspond to a given attribute.

Attribute Translation

At step 206 of FIG. 2, attributes in each record are translated. In some embodiments, translating attributes comprises a second record for variations of attributes of a first record. In other embodiments, translating attributes comprises translating attributes in each record of the plurality of records into uniform attributes. Additionally, translations, like attribute matches, may correspond to one or more confidence scores that indicate the likelihood that the identified attribute corresponds to the attribute translation.

Figure 4:
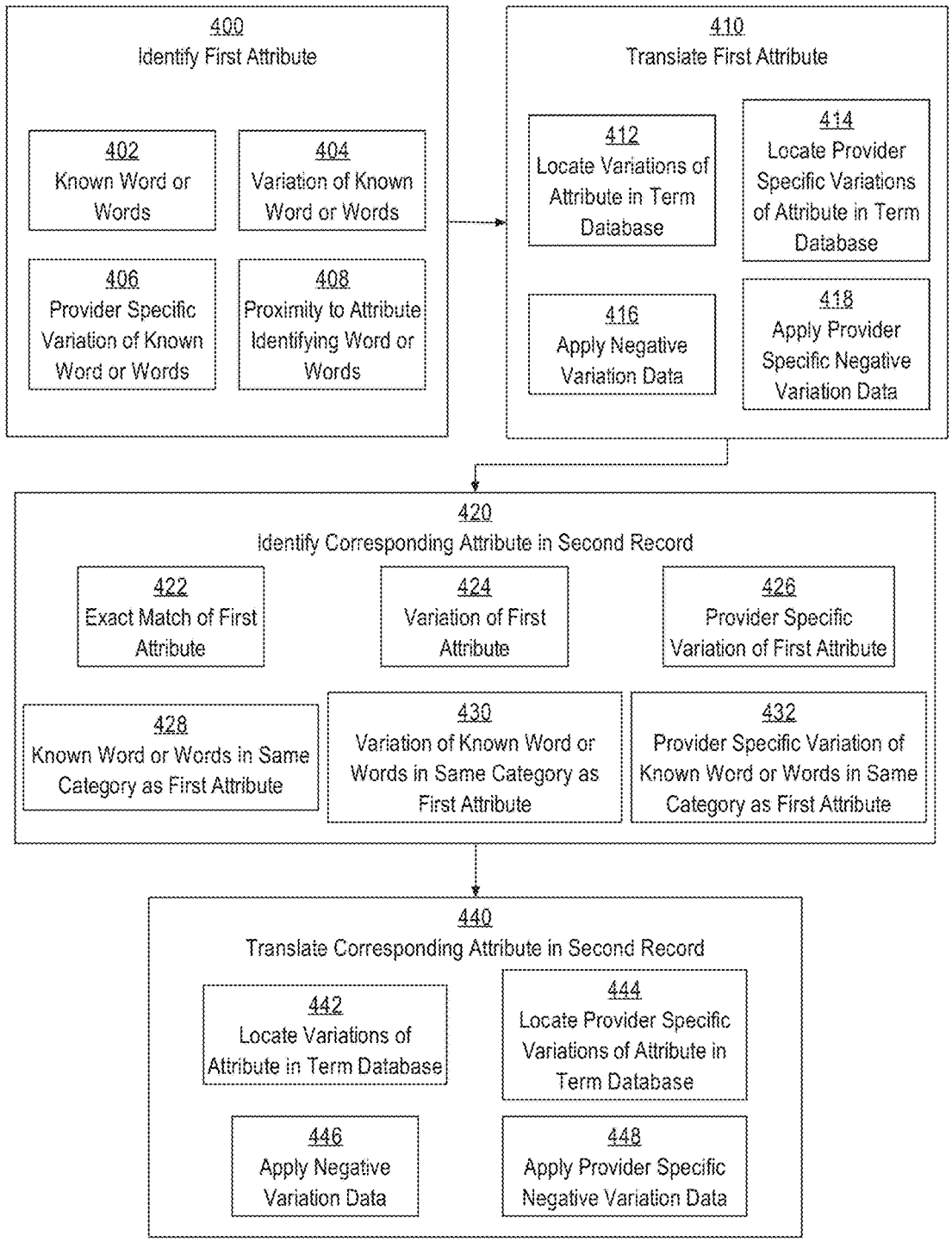
FIG. 4 illustrates a method or programming algorithm for translating attributes in a plurality of data records.

FIG. 4 illustrates a method for translating attributes in a plurality of data records. At step 400, a first attribute is identified in a first data record. For example, parsing logic 114 may access term database 140 to determine if one or more words in a string correspond to an attribute. Method 402 for identifying a first attribute includes determining that a first attribute in the first data record is/are a known word or known words. For example, in the case of hotel rooms, the bed type is an important attribute to match in order to determine that two records describe the same listing. Identifying the first attribute may thus include searching the first data record for known bed types, such as "king," "queen," "full," and "twin." Alternatively, an identified attribute may be compared to attributes in term database 140 to determine if the attribute comprises a known word or words.

Method 404 for identifying a first attribute includes determining that the first attribute in the first data record is a variation of a known word or words. In an embodiment, parsing logic 114 may use method 404 if an attribute cannot be identified using method 402. For example, if the first data record does not contain the words "king," "queen," "full," and "twin," parsing logic 114 may be configured to access a custom glossary in term database 140 that contains variations of attribute words. For example, the custom glossary may contain variations of "king," including "kng" and "kg." Using method 404, parsing logic 114 may search the first record for variations of the attribute words, such as "kng" and "kg." Method 404 may also include searching for location specific variations of attributes, such as translations of "king" in various languages dependent on the country in which the listing is located.

Method 406 for identifying a first attribute includes determining that a first attribute in the first data record is a provider specific variation of a known word or words. For example, term database 140 may include term variations for each specific provider. Thus, if a particular data source has a unique way of referring to a king bed, such as "president bed," an entry in term database 140 for the particular data source may list the unique phrase used to identify a king bed. Parsing logic 114 may determine that the record originates from the particular data source and access the entry in term database 140. Parsing logic 114 may then search the first record for the word "president." Alternatively, in embodiments, if parsing logic 114 is unable to identify attributes by known words or variations of known words, parsing logic 114 may compare the identified attributes to provider specific attributes stored in term database 140.

Method 408 for identifying a first attribute includes determining that the first data record includes an attribute identifying word or words. In an embodiment, term database 140 includes specific words or phrases that indicate proximity to an attribute. For example, term database 140 may include "bed type," "bed," and "room type" as attribute identifying words. Parsing logic 114 may search the first record for the attribute identifying words in order to find other words in close proximity. For example, if the only word in close proximity to "bed type" is "racecar," parsing logic 114 may identify the first attribute as "racecar."

At step 410, the first attribute is translated into a new form. In some embodiments, the attribute is translated into the form used by consolidation server computer 110 to describe the attribute to a user. For example, variations of "king" may all be translated to "king bed." In other embodiments, the attribute is translated into a common form of the attribute in order to increase the efficiency in which parsing logic 114 parses other records.

Method 412 for translating the first attribute includes locating variations of the attribute in a term database. For example, term database 140 may identify a common form of the attribute or a user friendly form of the attribute. Once the attribute has been identified, parsing logic 114 may use the variations of the attribute in the term database to translate the term.

Method 414 for translating the first attribute includes locating provider specific variations of the attribute in a term database. In the "president bed" example described above, a provider specific variation for "president" would be "king." Translating provider specific language into a common attribute may include locating the provider specific variations in term database 140 to determine to which common variations the provider specific variation is linked.

Method 416 for translating the first attribute includes applying negative variation data to the identified attribute. In an embodiment, parsing logic 114 contains rules that identify terms that are not to be translated or situation in which terms are not to be translated. For example, in the city of Queens, N.Y., many listings will contain the string "Queens." While in other cities "queens" would likely refer to a plurality of queen beds, in Queens, N.Y. the likelihood is higher than the string "Queens" refers to the city in which the listing is located. A negative variation rule may indicate that the string "queens" is not translated into "queen" for listings in a geographic region near Queens, N.Y. In some situations, an attribute may be translatable to a second attribute where the second attribute is not necessarily translatable to the first. For example, "garden view" may be translatable to "view" or "window" where "view" and "window" would not necessarily translate to "garden view." Thus, a negative variation rule may identify broad attributes that should not be translated into narrower attributes. In an embodiment, a machine learning tool creates the negative variation rules after receiving one or more indications that matched records do not describe the same listing or that matched attributes are not equivalent.

Method 418 for translating the first attribute includes applying provider specific negative variation data to the identified attribute. In an embodiment, parsing logic 114 contains various rules for translation based on the data source from which the record was received. For example, a specific provider may frequently use the phrase "a room fit for a king" to describe upscale properties. Parsing logic 114 may contain a rule for that provider that the word "king" is removed from the listing if it is preceded by "fit for a." As another example, a provider may describe a room as a "twin" to indicate that the room has two beds. While a provider specific variation in term database 140 could be used to identify the word "twin" to translate to a number of beds, the word "twin" may first have been identified using method 402 as a bed type attribute. Parsing logic 114 may contain a rule for that provider to not translate the word "twin" into "twin bed" so that it can be identified later as a number of beds.

In some embodiments, steps 400 and 410 are repeated with each record of the plurality of records. Each translated attribute may be stored with an attribute type. For example, a "king bed" attribute may be stored as "king bed" with the attribute type "bed type." The attribute type may be used by record comparison logic 116 to determine that attributes in multiple translated records correspond to each other. In other embodiments, attributes in a first record are translated into multiple variations of the same attribute and matched against corresponding attributes in a second record. In further embodiments, a corresponding attribute is identified in a second record and translated to match the first attribute.

At step 420, a corresponding attribute in the second record is identified. Method 422 for identifying a corresponding attribute in a second record includes finding an exact match of the first attribute or an exact match of the translation of the first attribute. Method 424 for identifying a corresponding attribute in a second record includes locating, in the second record, variations of the first attribute or translation of the first attribute as identified by term database 140. Method 426 for identifying a corresponding attribute in a second record includes locating, in the second record, a provider specific variation for the first attribute or translation of the first attribute as identified by term database 140.

Method 428 for identifying a corresponding attribute in a second record includes searching for a known word or words in the same category as a first attribute. Method 426 allows parsing logic to locate attributes that correspond to the first attribute but specifically do not match between records. For example, term database 140 may include a plurality of attributes in each category. If the first identified attribute was "king bed," parsing logic 114 may retrieve attributes in the same category as "king bed" from term database 140, such as "queen bed," "twin bed," and "full bed," and search for the attributes within the second data record.

Method 430 for identifying a corresponding attribute in a second record includes searching for variations of a known word or words in the same category as the first attribute. For example, term database 140 may include variations for "queen bed," "twin bed," and "full bed." Parsing logic 114 may search the second data record for attributes that match the variations of the different bed types as identified by term database 140. In a similar manner, method 432 for identifying a corresponding attribute in a second record includes searching for provider specific variations of a known word or words in the same category as the first attribute. In the above example, after the provider of the second data record is identified, parsing logic 114 may search for variations of "queen bed," "twin bed," and "full bed" commonly used by the provider of the second data record as identified by term database 140.

In some embodiments, once a corresponding attribute is identified in the second data record, parsing logic determines whether the first attribute matches the second attribute and sends the data to record comparison logic 116. In other embodiments, parsing logic 114 also translates the corresponding attribute in the second record, thus increasing the efficiency in which the second record may be compared to other records. Parsing logic 114 may use similar methods to translate the second record as was used to translate the first record. Method 442 for translating the corresponding attribute in the second record includes locating variations of the attribute in the term database. Method 444 for translating the corresponding attribute in the second record includes locating provider specific variations of the attribute in the term database. Method 446 for translating the corresponding attribute in the second record includes applying negative variation data to the correspond attribute. Method 448 for translating the corresponding attribute in the second record includes applying provider specific negative variation data to the corresponding attribute.

Confidence Scores

Referring back to FIG. 2, at step 208 attributes in the plurality of records are compared to determine if the records describe the same listing or inventory item. For example, record comparison logic 116 may compare identified attributes in two records to determine if the records describe the same listing. In some embodiments, record comparison logic 116 utilizes simple pattern matching techniques to determine strings in a first record that match strings in the second record. In more complex embodiments, record comparison logic 116 utilizes the parsed data records to create a confidence score that describes the likelihood that two records match.

Figure 5:
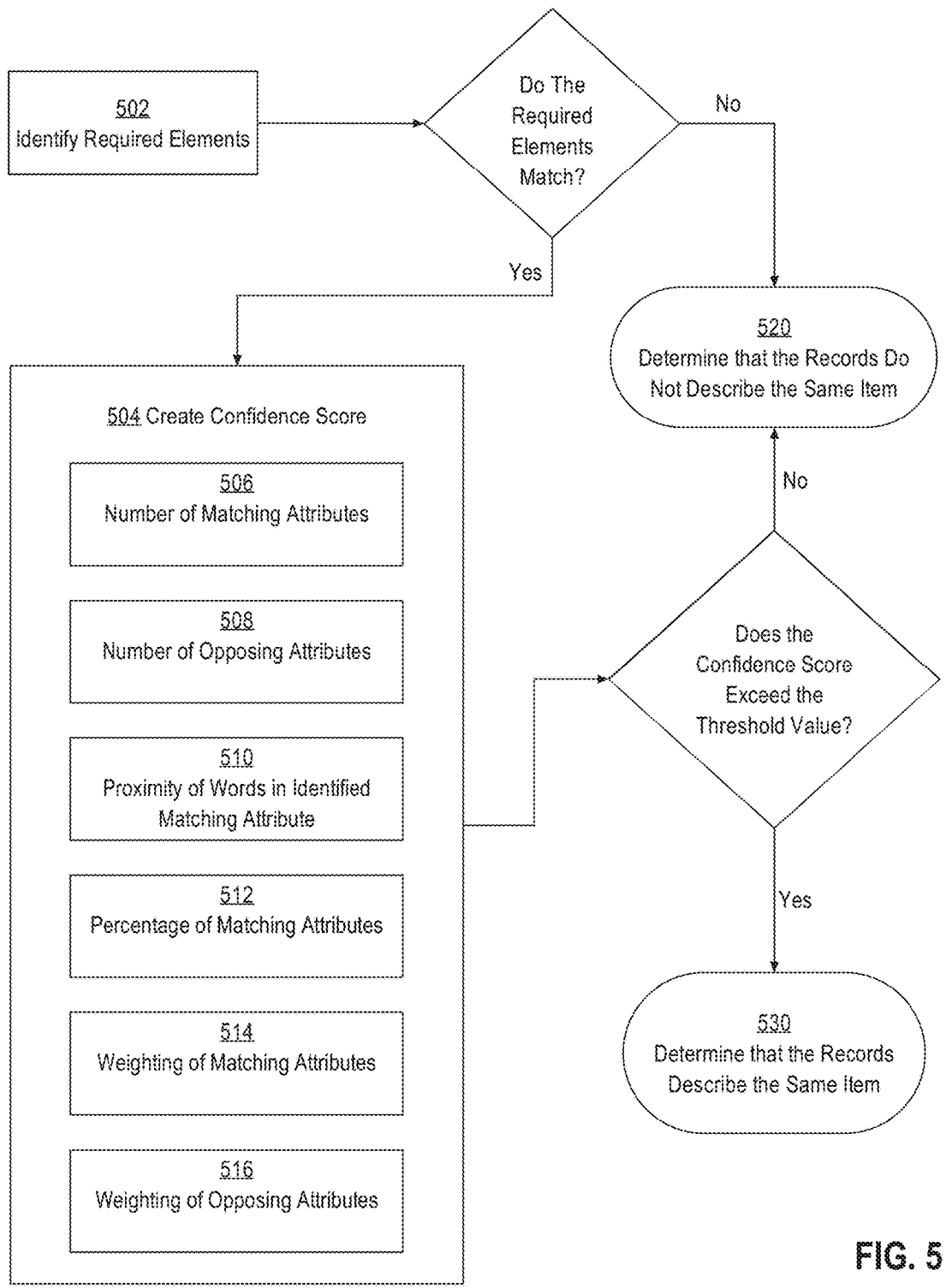
FIG. 5 illustrates a method or programming algorithm for determining whether two data records describe the same listing.

FIG. 5 illustrates a method for determining whether two data records describe the same listing.

At step 502, required elements are identified in the two data records. In an embodiment, required elements are attributes that, if present in the data records, must match for the data records to be considered to describe the same listing or inventory item. For example, the bed type in a hotel room may be identified as a required element, such that if the bed types do not match, the two records are not considered to describe the same listing. Record comparison logic 116 may use the translated attributes created by parsing logic 114 to determine whether the required elements match. For example, if a first record includes the string "kngbd" and a second record includes "single king," the translated attributes for both records may be "king bed." Record comparison logic 116 may determine that the two attributes match and move to step 504. If the required elements do not match, at step 520 record comparison logic 116 determines that the two records do not describe the same listing or inventory item.

At step 504, a confidence score is created which describes the likelihood that two records describe the same listing or inventory item. For example, record comparison logic 116 may apply one or more factors to determine a likelihood that the two records describe the same listing or inventory item. Factor 506 describes the number of attributes that match between the first record and the second record. For example, if both records list "refrigerator," "microwave," and "LED TV," factor 506 may indicate that three attributes match in the two records. Factor 508 describes the number of attributes that correspond to the same attribute type but do not match. For example, if one record includes "garden view" and a second record includes "street view," the two records describe the same attribute, i.e. the view, but do not contain matching values. As another example, if a first record contains the attribute "fourth floor" and a second record contains the attribute "ground floor," record comparison logic 116 may determine that the records contain opposing attributes, i.e. attributes that correspond to the same attribute type but do not match.

Factor 510 describes the proximity of words in an identified matching attribute. For example, parsing logic 114 may determine that the string "view of the street" translates to the attribute "street view." Record comparison logic 116 may take into account the number of words between the word "view" and the word "street" in creating a confidence score that the two records describe the same attribute. In an embodiment, a weighting assigned to the identified matching attribute may be decremented based on the number of words between the two words in the attribute. In another embodiment, a confidence score that describes a likelihood that the string translates to the given attribute may be decremented based on the number of words between the two words in the attribute. For example, "view of the street" may be assigned a value that is lower than a value assigned to "street view," but higher than a value assigned to "view that overlooks the street."

Factor 512 describes a percentage of attributes that match between the two records. The percentage of attributes that match may be based on attributes that have been identified in both records or attributes that have been identified in either record. An example comparison of two records may include five attributes in a first record that do not correspond to any attributes in the second record, ten attributes in the first record that match attributes in the second record, five attributes in the first record that correspond to attributes in the second record but do not match, and five attributes in the second record that do not correspond to attributes in the first record. In some embodiments, the attributes in each record that do not correspond to attributes in the other record may be factored in to the determination of factor 512. With ten matching attributes and fifteen attributes that do not match, the percentage of matching attributes is 40% between the two records. In some embodiments, each record maintains its own percentage of matching attributes. Thus, for the first record, only attributes identified in the first record may be factored in to the determination of factor 512. With ten matching attributes and ten attributes in the first record that either do not match or do not correspond to attributes in the second record, the percentage of matching attributes in the first record is 50%.

Factor 514 describes weightings of attributes in the records. In an embodiment, each attribute type is given a weighting based on how much influence a match or mismatch of the attribute has on the likelihood that the two records describe the same listing. Weightings may be based on attributes that are unlikely to change based on the data source. For example, a hotel room displayed by two separate data sources is unlikely to undergo physical changes based on the data source. Thus, attributes such as "refrigerator" and "safe" may contain relatively high ratings. Alternatively, attributes that may be negotiated separately from data source to data source may contain relatively low ratings. For example, one data source may offer a hotel room with free wireless network connectivity (for example, "WiFi" connections) at a first price while a second data source may offer the same hotel room without free WiFi but at a lower price than the first price. As the cost of WiFi may vary for the same hotel room, the "free WiFi" attribute may receive a relatively low rating.

In an embodiment, weightings are also based on the variability of attributes across multiple inventory items. For example, a large percentage of hotel rooms contain a shower. Thus, the fact that two records indicate the existence of a shower does not necessarily help raise the confidence that the two records describe the same listing or inventory item. Attributes, such as "shower," that are highly prevalent across listings may contain a relatively low weighting. Alternatively, attributes that are extremely room specific may contain relatively high weightings. For example, only a small percentage of rooms are considered penthouse suites. Thus, a match between two attributes of "penthouse suite" may contain a relatively high weighting.

In an embodiment, weightings are stored in term database 140 in relation to specific attributes or attribute categories. In some embodiments, attributes may be matched across two records even if the attributes are not listed in term database 140. For example, a hotel may give the same three sentence description to each data source. While the three sentence description may not contain identifiable attributes, record comparison logic 116 may still determine that two records contain the same three sentence description. In an embodiment, the matched three sentence description is assigned a weighting based on the number of words or characters that match between two records. In some embodiments, exact matches of unidentified attributes may be given a relatively low weighting to ensure the highest probability that two matched data records describe the same listing.

Factor 516 describes weightings of opposing attributes in the records. In an embodiment, some attributes are weighted differently if they match than if they do not match. For example, if common attributes do not match, the fact that the common attribute does not match may receive a high weighting. If a record indicates that a room contains a shower and a second record contains the attribute "no shower," the opposing attributes may be given a large weighting because of the rarity of a hotel room not containing a shower. Alternatively, some attributes may contain similar weights when they match as when they do not match. For example, attributes that describe features that are unlikely to change across data sources may receive relatively high weightings when they do not match because it is unlikely that a hotel would vary the physical composition of the room for each data source.

In an embodiment, a confidence score describing the likelihood that two records match is based on a plurality of confidence scores describing the likelihoods that particular strings describe particular attributes, that particular strings translate into particular attributes, that particular attributes in a first record correspond to particular attributes in a second record, and that corresponding attributes in the first and second records match. For example, parsing logic 114 may store a confidence score in association with each attribute and in association with each translation. For example, parsing logic 114 may receive the string "the view from the balcony window looks out to the street." Parsing logic 114 may assign a confidence score to a correspondence of the string to a 'view' attribute. Additionally and/or alternatively, parsing logic 114 may assign a confidence score to a translation of the string to "street view." Parsing logic 114 may additionally assign a confidence score to a determination that "the view from the balcony window looks out to the street" corresponds to a string in a second record that reads "accessible from the street. The view of the garden . . . " Record comparison logic 116 may assign a confidence score to a determination that the two strings match or do not match. Given the proximity of both the word 'street' and the word 'garden,' record comparison logic 116 may assign a low confidence score to a determination that the two strings do not match. Any or all of the additional confidence scores may be used to create the confidence score that describes the likelihood that the two records describe the same listing or inventory item.

Additionally and/or alternatively, confidence scores describing the likelihoods that particular strings describe particular attributes, that particular strings translate into particular attributes, that particular attributes in a first record correspond to particular attributes in a second record, and that corresponding attributes in the first and second records match may be provider specific. In an embodiment, record comparison logic retrieves data source specific information when comparing attributes in the records. For example, a first data provider may frequently provide inaccurate or incomplete data. Matches to the first data source may receive a lower confidence score than matches to a data source that generally provides accurate and complete data. As another example, a first data source may frequently describe the attribute "garden view" using the string "excellent view of foliage from the balcony." The string "excellent view of foliage from the balcony" may be translated to the attribute "garden view" with a higher confidence score for the first data source than the same string received from a second data source that has no history of using that language.

Record comparison logic 116 may use any combination of the factors described above to create a confidence score that describes the likelihood that the two records describe the same listing or inventory item. Combining the factors may be accomplished through general normalization methods, such that two records that are identical receive a score of "1," two records with absolutely no attributes in common receive a score of "0," and all other combinations receive a score between 0 and 1.

Once a confidence score has been created, the confidence score may be compared against a threshold value. The threshold value may indicate a minimum confidence score required for consolidation server computer 110 to determine that the two records describe the same listing. For example, a high threshold value may be set to lower the risk that two records describing different listings or inventory items are determined to describe the same listing.

Consolidation server computer 110 may receive the threshold value from administrative computing device 150 prior to receiving records 102 and 104. In an embodiment, the threshold value is programmable, such that administrative computing device 150 may raise or lower the threshold value at will. If record comparison logic 116 determines that the confidence score does not exceed the threshold value, at step 520 record comparison logic 116 determines that the records do not describe the same listing or inventory item. If record comparison logic 116 determines that the confidence score exceed the threshold value, at step 530 record comparison logic 116 determines that the records describe the same listing or inventory item.

Attributes from two matched records may be combined before comparing the attributes of the records to a third record. For example, if both records contain data that allows record comparison logic 116 to determine that the records match but each record is missing data available in the matched record, record comparison logic 116 may concatenate the attributes in both records to match the two records to a third record. By combining the attributes from both records before attempting to make additional matches, record comparison logic 116 may maximize its ability to match records. For example, if a first record and a second record contain very little information, but they have the same description verbatim and each record contains one additional attribute that is not in the other, the additional attribute may allow the records to be matched more easily to a record that does not contain the same description but describes the same listing or inventory item.

Additional Information Requests

In some embodiments, record comparison logic 116 may determine that there is not enough information in a record to properly determine that the record matches any other records. This may occur when a data source includes very little information in a particular listing. For example, one data source may list just the price, bed type, and number of beds for a particular listing. Given that the price of a hotel room may vary across different data sources, the two remaining pieces of information may not be enough to match the listing to any other listings.

In some embodiments, in response to record comparison logic 116 determining that there is not enough information in a record to properly determine that the record matches any other records, listing interface logic may create a request for more information. Additionally and/or alternatively, records that contain too little information may be stored separately or sent to administrative computing device 150. Consolidation server computer 110 may receive the request for more information from administrative computing device 150.

Listing interface logic 112 may send the request for more information to a source of the listing. For example, if the listing is for a hotel room with a particular hotel chain, listing interface logic 112 may send a request to the particular hotel chain for additional information. The request for additional information in some embodiments is listing specific. For example, listing interface logic 112 may identify the particular listing for which information is lacking. Additionally and/or alternatively, the request for additional information may be a request for hotel specific information, such as amenities that are available to all guests regardless of the room. For example, a hotel chain may have Free WiFi and continental breakfast for all guests.

In an embodiment, when listing interface logic 112 receives additional information from the source of the listing, the additional information may be added to the information lacking in the record. The record, with the additional information, may then be compared against other records through the method described above. In embodiments where listing interface logic 112 receives additional information that is specific to a source of the listing, the additional information may be added to all records for the specific source. For example, if a data source lists three types of hotel rooms at the same property, hotel specific information may be added to each of the listings from the data source that refer to the same property. In this way, consolidation server computer 110 may maximize the benefit of receiving additional information from the source of the listing. Additionally, the additional information may be stored in term database 140 to be retrieved for additional listings. For example, if listing interface logic 112 receives a data record that is associated with the same hotel chain, the additional information may be added to the data record before the record is compared to other records.

Automatic Overrides

In some embodiments, record comparison logic 116 applies override rules after matching two records. An override rule may indicate one or more conditions that, if met, cause record comparison logic 116 to treat two previously matched records as separate listings. Override rules may be valuable for situations where record comparison logic 116 incorrectly matches two records based on the data available. For example, two records with a price differential of ten dollars may be describing the same listing because the various data sources negotiate hotel prices with the property independently. On the other hand, two records with a price differential of two hundred dollars are unlikely to be describing the same listing regardless of the fact that the data sources negotiate hotel prices independently. The more likely scenario is that record comparison logic 116 incorrectly matched the two records.

A pricing override may indicate a maximum pricing differential that may exist between two records that are determined to describe the same listing or inventory item. For example, a pricing override may be set at one hundred dollars to ensure that two records with radically varying prices are never treated as the same listing. The pricing override rules may be either static or dynamic. A static pricing override rule is a set value that applies uniformly to each record, such as a pricing override of one hundred dollars. Regardless of the source of the records or the pricing of each record, a price differential over one hundred dollars would cause the records to be treated as separate listings.

A dynamic pricing override rule is a value that changes depending on additional information. For example, a dynamic pricing override rule may be set at twenty percent of the lower value between the two records. Thus, if the record with the lowest price is set at one hundred dollars, the pricing override rule would be set to twenty dollars. If the record with the lowest price is set to five thousand dollars, the pricing override rule would be set to one thousand dollars. More complex dynamic pricing override rules may be logarithmic, such that the override rule is set at twenty percent for less expensive properties but decreases to five percent for more expensive properties.

Manual Overrides

Referring back to FIG. 2, if record comparison logic 116 determines that the two records do not describe the same data item, at step 210, the items are treated as separate listings. In an embodiment, the two records may still be matched if record comparison logic 116 determines that the two records do not describe the same data item. For example, administrative computing device 150 may access consolidation server computer 110 through administrative override logic 124 to indicate that two records actually describe the same listing. In response to receiving the indication from administrative computing device 150, administrative override logic 124 may cause consolidation server computer 110 to determine that the two records describe the same listing or inventory item.

The existence of administrative override logic 124 allows consolidation server computer 110 to set stricter rules for determining that two records describe the same listing or inventory, thus allowing consolidation server computer 110 to avoid potentially harmful mismatching. For example, consolidation server computer 110 may set a high threshold value for the confidence score so that only records that are extremely likely to describe the same listing are matched. Additionally and/or alternatively, consolidation server computer 110 may set a low price differential for the pricing override such that only records that describe listings extremely close in value may be matched.

In an embodiment, administrative override logic 124 sends a message to administrative computing device 150 when two records are not matched, but are close to being matched. For example, record comparison logic 116 may additionally compare the confidence score to a buffer value that is set lower than the threshold value, e.g. a buffer value that indicates 65% confidence that two records describe the same listing or inventory item versus a threshold value that indicates an 85% confidence. If a confidence score that describes the likelihood that two records describe the same listing or inventory item is higher than the buffer value but lower than the threshold value, a message may be generated and sent to administrative computing device 150. The message may request a determination that the records either describe the same listing or inventory item or describe different listings or inventory items. A buffer value may also be set for the pricing override. For the pricing value, a buffer value may be set that indicates a higher price differential than the pricing override value. For example, a price differential over $40 may cause record comparison logic 116 to treat the two records as separate listings, but a message may be generated and sent to administrative computing device 115 if the price differential is between $40 and $60.

If consolidation server computer 110 receives a positive override, i.e. an override that indicates that two records should be matched, record comparison logic 116 may determine that the two records describe the same listing or inventory item and the method may move to step 214. If consolidation server computer 110 does not receive a positive override, at step 212 the records are displayed to consumer computing device 160 as separate listings. In some embodiments, if a message is sent to administrative computing device 150, an indication from administrative computing device 150 that the records were properly treated as separate listings causes the method to move to step 212.

In an embodiment, administrative computing device 150 may also provide negative overrides through administrative override logic 124. A negative override may indicate that two records describe different listings or inventory items. Additionally, a negative override may indicate that attributes in two records either do not correspond to each other or do not match each other. In an embodiment, administrative override logic 124 causes consolidation server computer 110 to treat two previously matched records as separate listings in response to receiving a negative override from administrative computing device 150. The two records may then be displayed as separate listings or inventory items to consumer computing device 160. Additionally, administrative override logic 124 may store data indicating that the two records were manually unmatched. Administrative override logic 124 may send this data to machine learning logic 120.

In some embodiments, in response to receiving a negative override from administrative computing device 150, administrative override logic 124 may cause display of matched attributes on administrative computing device 150. Administrative override logic 124 may receive an indication from administrative computing device 150 that two attributes do not correspond to the same attribute, that two attributes do not match each other, or that an identified attribute does not translate to a particular attribute. Administrative override logic 124 may also store data indicating that the two attributes in the two records were manually unmatched. Administrative override logic 124 may send this data to machine learning logic 120.

In an embodiment, in response to receiving a negative override for two or more records, administrative override logic 124 may cause administrative computing device 150 to display matching data relating to the two or more records. For example, if administrative override logic 124 receives a negative override regarding two hotel listings, administrative override logic 124 may display the attributes that were matched to create the confidence score on administrative computing device 150. Administrative computing device 150 may then send negative overrides relating to one or more matched attributes in the two records to consolidation server computer 110.

Record Consolidation

Referring back to FIG. 2, at step 214 the matched records are consolidated into one or more consolidated records. Consolidation logic 118 may add attributes to one of the matched records or create one or more new records with matched attributes. In an embodiment, consolidation logic 118 chooses a base record from the matched records to create the one or more consolidated records. Consolidation logic 118 may choose the base record based on stored provider information for the matched records. For example, consolidation logic 118 may determine that information received from a first data source tends to be more clear or readable than data received from a second data source. If consolidation logic 118 matches two records between the first data source and the second data source, consolidation logic 118 may choose the record originating from the first data source to act as the base record.

Additionally and/or alternatively, consolidation logic 118 may determine which of the matched records includes the best and/or the clearest data to use as a base record. For example, each attribute translation may be stored with clarity ratings. Consolidation logic 118 may determine which record contains the highest clarity ratings and use that record as the base record. As another example, consolidation logic 118 may determine which record contains the largest amount of addition information, such as photographs or descriptions, and use that record as a base record. Consolidation logic 118 may then buttress the base record with additional information in the matched record. For example, if the matched record describes the square footage of the room and the square footage is absent in the base record, then the square footage from the matched record may be added to the base record.

In an embodiment, a record is created from translated attributes and buttressed with additional information from either of the matched records. Consolidation logic 118 may separate attributes into matched attributes, unmatched attributes that do not change between providers, and unmatched attributes that may change between providers. A matched attribute is an attribute that exists in both data records. The matched attributes may be translated using data from term database 140 into a user friendly form. Unmatched attributes that do not change between providers include attributes that are room specific, such as physical characteristics. For example, the existence of a refrigerator in a hotel room likely would not change based on the provider. Thus, if one data source lists a refrigerator in a hotel room and the second data source does not, consolidation logic 118 may determine that the room contains a refrigerator and add the refrigerator to the description. If two attributes are opposing, consolidation logic 118 may either choose an attribute based on provider reliability data or leave the unmatched attribute out of the consolidated description. Unmatched attributes that may change between providers include attributes that are provider specific, such as cost and available payment methods. Available payment methods may include a type of payment that is accepted, such as credit card, debit card, or online fund transfer systems such as PayPal, types of transactions that are accepted, such as "pay now," "pay later," and partial pay up front, and cancellation costs.

In another embodiment, matched attributes from each record may be chosen based on a clarity rating for the expression of the attribute in a particular record. Term database 140 may store clarity ratings for each translation of an attribute as described above. In creating the consolidated records, consolidation logic 118 may choose the attribute from one of the matched records that contains the highest clarity rating. In this way, consolidation logic 118 preserves the language used by the data sources when creating the consolidated records.

After the records are consolidated, consolidation logic 118 determines if key terms in the records differ. Key terms may relate to provider specific attributes, such as price or payment method. In the embodiment illustrated in FIG. 2, if key terms are determined to be the same for each record, at step 216 a single consolidated record is displayed that maps to one of the data sources. If key terms in the records differ, a consolidated record may be generated for each differing record. Thus, if the price of a hotel room is cheaper at one data source than it is at the other, a record may be created for each data source. In one embodiment, all of the information in the consolidated records other than the differing terms are expressed in the same manner. For example, if the expression of a first attribute from a first record is used for the first consolidated record, the same expression of the first attribute may be used for the second consolidated record. In other embodiments, each of the consolidated records is created using a different base record. For example, if a first data source offers a different price than a second data source, the first consolidated record would comprise attributes as described in the first data record and any additional attributes from the second data record that do not exist in the first data record. The second data record would comprise attributes as described in the second data record and any additional attributes from the first data record that do not exist in the second data record.

In some embodiments, a single consolidated record is made comprising matched attributes and unmatched attributes that do not change between providers. The consolidated record may include an option to choose a provider to use to complete the transaction. The provider option may include additional attributes that are unique to the provider. For example, if each provider quotes a different price and payment method, the price and payment method may be displayed next to the provider option. If all providers quote the same price and different payment methods, the price may be included in the main portion of the consolidated record and the payment method may be displayed next to the provider option.

Consolidated records may be displayed through presentation/user interface logic 126 to consumer computing device 160. In an embodiment, each presented record contains a link to one or more data sources. For example, in embodiments where a single consolidated record is displayed, the single consolidated record may comprise links to each available data source. A selection of a data source may cause consumer computing device 160 to access the data source directly in order to complete the transaction. For example, a selection of a data source may cause a browser on consumer computing device 160 to navigate to a webpage hosted by the selected data source.

Record Selection

In some embodiments, digitally programmed logic is used to select a record to display. Record selection logic 122 may determine which record to display based on data source information or based on key differences between records. For example, in the embodiment illustrated in FIG. 2, if two records are determined to contain different key values, record selection logic may determine if one of the records is preferable to the other. If one record is determined to be preferable to the others, at step 218 record selection logic 122 may choose to display only the preferable record. In other embodiments, record selection logic 122 may choose the order in which to display the records based on a determination that one or more records are preferable to others. At step 220, if neither record is determined to be preferable, record selection logic 122 may display both records.

In an embodiment, record selection logic 122 may determine which record is preferable based on a difference in price or payment methods. For example, a first record may list the price of a hotel room at $100 while all other records list the price of the hotel room at $120. If all other attributes are equal, record selection logic 122 may choose to only display the record with the price of $100 or to display the record with the price of $100 as the first listing. As another example, if all of the records contain the same price but one record requires "pay now" and a second record offers "pay later," record selection logic 122 may choose to display the record with the "pay later" option.

Record selection logic 122 may also select a record based on data source information. Consolidation server computer 110 may store metrics associated with each data source. The metrics may include the likelihood of completing a transaction or user reviews of the data source. The likelihood of completing a transaction may be determined by consolidation server computer 110 based on data created by consolidation server computer 110 or received from the data sources. For example, consolidation server computer 110 may store data indicating each selection of a listing of a first data source and each selection of a listing of a second data source. Consolidation server computer 110 may receive data from each data source that indicates whether a successful transaction occurred. Consolidation server computer 110 may also receive data indicating whether an error occurred, such as an inability of the data source to complete the transaction using a specific payment method. Based on the number of record selections and the number of completed transactions, consolidation server computer 110 may calculate the likelihood that a specific data source will complete a transaction.

In an embodiment, record selection logic 122 chooses the data source that is most likely to complete a specific type of transaction. As an example, a first data source may have a high success rate for single booking transactions, such as booking a single room. A second data source may have a lower success rate for single booking transactions, but a high success rate for multiple booking transactions, such as a reservation of twenty hotel rooms. If two records contain comparable attributes, record selection logic 122 may determine the type of transaction initiated by consumer computer device 160. If the transaction is a single booking transaction, record selection logic 122 may display the first data source. If the transaction is a multiple booking transaction, record selection logic 122 may display the second data source.

Record selection logic 122 may use any of the above described metrics to determine which record to display. For example, record selection logic 122 may choose to display a record from the data source with the highest user reviews or the highest probability of completing a transaction. In embodiments, if only one consolidated data record is displayed, record selection logic 122 may choose a destination for the consolidated record based on one of the metrics described above. For example, if multiple data sources offer a room at the same price but a particular data source is determined to be more likely to complete the transaction, the particular data source may be selected by record selection logic 122 as a destination for the record. Thus, if a selection of the record is received by presentation/user interface logic 126 from consumer computing device 160, presentation/user interface logic 126 may cause consumer computing device 160 to view the record displayed by the particular data source.

Record selection logic 122 may use additional data to determine which record to display or which data source to map to the consolidated record. Additional data may include data that indicates a higher benefit to consolidation server computer 110. For example, if a first data source offers a higher commission to consolidation server computer 110 than a second data source, and all other attributes in the record are equal, record selection logic 122 may display the record with the higher commission. Record selection logic 122 may also look at benefits such as customer retention. For example, record selection logic 122 may determine, based on stored data, that customers who use a first data source tend to book a second trip through consolidation server computer 110 more frequently than customers who use a second data source.

Record selection logic 122 may use any combination of the above described methods to determine which records to display or the order in which to display records. For example, record selection may balance the price of a room at a first data source with the available payment options, the likelihood of the transaction completing, a rating of the data source, and the relative benefits of choosing one data source over another to consolidation server computer 110.

Alternative Selection

Figure 6:
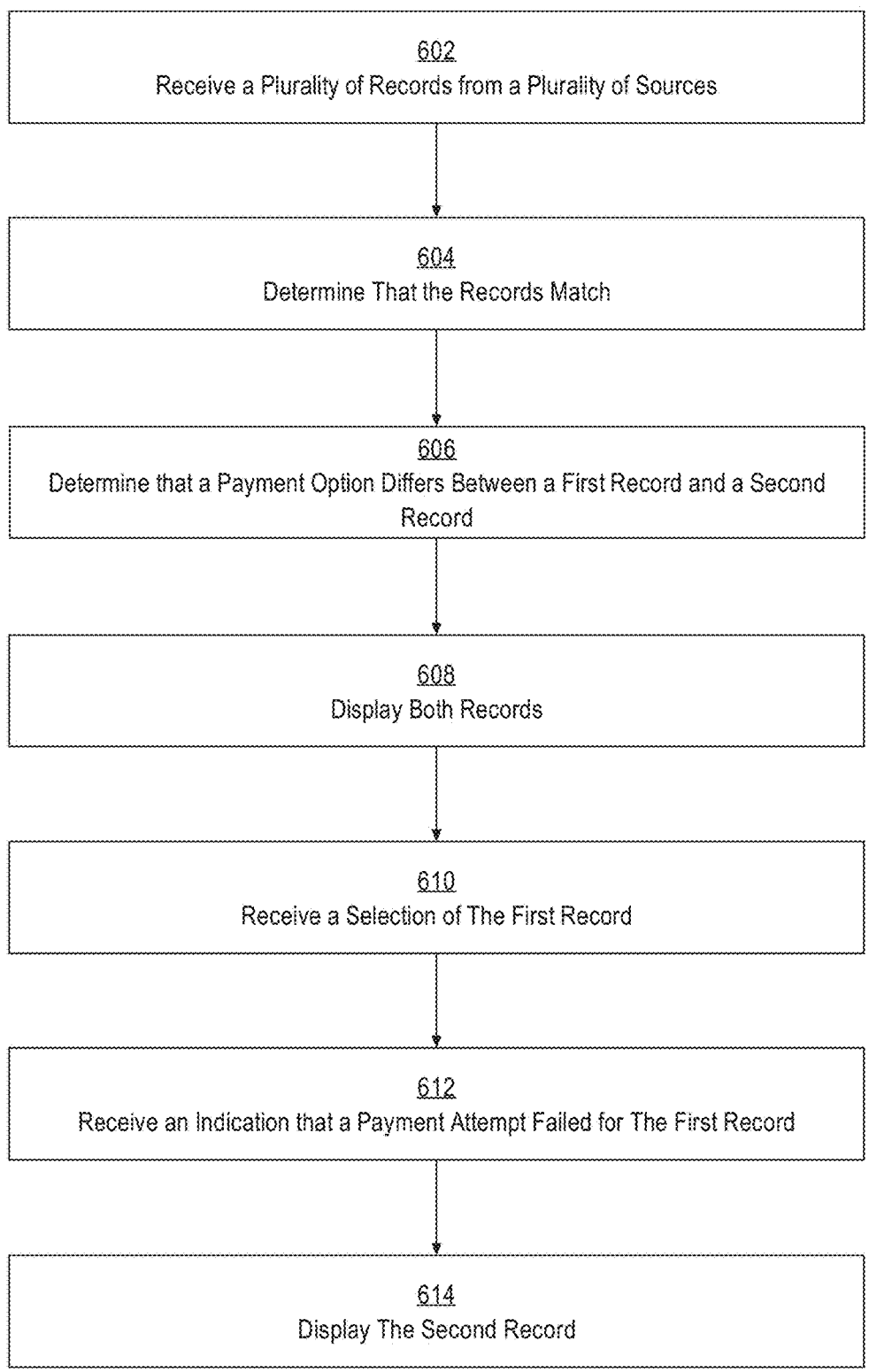
FIG. 6 illustrates a method or programming algorithm for utilizing record matches to dynamically provide alternative options for completing a transaction.

In an embodiment, record selection logic uses matched data to display additional records in the case of a transaction failure. FIG. 6 illustrates a method for utilizing record matches to dynamically provide alternative options for completing a transaction.

At step 602, a plurality of record are received from a plurality of sources. For example, consolidation server computer 110 may receive records 102 and records 104 from listing server computer 106 and listing server computer 108 respectively through listing interface logic 112. At step 604, two records are matched. For example, parsing logic 114 and record comparison logic 116 may match two records using any of the methods described above. At step 606, a determination is made that a payment method differs between the two records. For example, record selection logic 122 may determine that a first record either has a different cost or has different payment options. At step 608, both records are displayed. In some embodiments, a single consolidated record may be displayed with an option to select either data source, or displayed as a single consolidated record with one or more data sources suppressed.

At step 610, a selection of a first record is received. For example consolidation server computer 110 may receive a selection of a first record through presentation/user interface logic 126. Upon receipt of the selection of the first record, presentation/user interface logic 126 may cause consumer computing device 160 to access a first data source associated with the first record. In an embodiment, presentation/user interface logic 126 tracks the success or failure of the transaction. For example, presentation/user interface logic 126 may embed data into the link that notifies consolidation server computer 110 when the transaction has been completed.

At step 612, an indication that the transaction has failed for the first record is received. For example, consolidation server computer 110 may receive a notification from the first data source that the transaction failed. A transaction may fail for multiple reasons. For example, the first data source may no longer have the ability to offer the listing or inventory item. As another example, the payment for the room may have failed.

At step 614, in response to determining that a transaction failed, the second record may be displayed. For example, consolidation server computer 110 may display a matched record through presentation/user interface logic 126 to consumer computing device 160. A different record may be displayed depending on the reason for the transaction failure. For example, if a transaction failed because the data source no longer has access to the room, any of the remaining records from different data sources may be displayed. If a transaction failed because an account used for the transaction does not have sufficient funds, consolidation server computer 110 may select a record that contains a "pay later" payment option. Additionally and/or alternatively, consolidation server computer 110 may display a record that allows payment through other financial carriers. For example, if the first data source only accepts payment through PayPal, consolidation server computer 110 may display a second record that accepts payment through credit card as well. In displaying records with additional payment options, consolidation server computer 110 increases the likelihood that a transaction is completed.

Machine Learning

In an embodiment, administrative override logic 124 and presentation/user interface logic 126 sends override data to machine learning logic 120. Machine learning logic 120 may be configured or programmed to identify patterns in negative overrides and create new rules based on the identified patterns in the negative overrides. Machine learning logic 120 may create the new rules for parsing logic 114, record comparison logic 116, consolidation logic 118, and selection logic 122. Machine learning logic 120 may create the new rules based on negative overrides relating to attribute matches, record matches, record consolidation, or record selection.

Machine learning logic 120 may create rules for parsing logic 114 after receiving an indication of one or more negative overrides. For example, machine learning logic 120 may create a rule that states: "fit for a king" does not translate to the attribute "king bed." If parsing logic 114 recognizes the word "king," parsing logic 114 may determine whether the word "king" is encompassed in the string "fit for a king" before determining that the word "king" matches the "king bed" attribute. Additionally and/or alternatively, parsing logic 114 may use the rule as an override for a match. For example, once attributes have been identified and translated in a record, parsing logic 114 may apply the rules created by machine learning logic 120 to override the identification or translation. Rules created by machine learning logic 120 may be generally applicable, such as the "king" example described above, or specific to particular providers. Particular provider rules may be created by machine learning logic 124 in response to determining a provider specific pattern in negative overrides.

In an embodiment, machine learning logic 120 creates one or more rules that lower a confidence score for a particular attribute matching. Machine learning logic 120 may identify a specific attribute that tends to be unmatched for a particular provider and create a rule that lowers the confidence score for that particular provider and that particular attribute accordingly. For example, a particular provider may repeatedly use the phrase "twin" to describe two beds. If the "twin" attribute tends to be unmatched, the confidence score for the matching of "twin" to the bed type for that particular provider may be decreased by machine learning logic 120.

In an embodiment, machine learning logic 124 recognizes patterns and uses the patterns to create new rules. For example, machine learning logic 120 may determine that records for a particular provider are repeatedly unmatched. Machine learning logic 120 may review the matched attributes in the unmatched records to find a common attribute. If machine learning logic 120 identifies that the unmatched records contain the attribute "twin," machine learning logic 120 may create a rule that lowers the confidence score for that provider and that attribute.

In an embodiment, machine learning logic 120 creates rules for record comparison logic 116. For example, machine learning logic 120 may receive multiple negative overrides between records where the overall confidence score exceeded the threshold. In response, machine learning logic 120 may raise the threshold. Additionally and/or alternatively, machine learning logic 120 may search for attributes in the records that received negative overrides. As an example, machine learning logic 120 may determine that the records that received a negative override all contained a match for the attribute "refrigerator" and that the weighting of the match raised the overall confidence score to create a match between each set of records. In response, machine learning logic 120 may lower the confidence score associated with the attribute "refrigerator."

In an embodiment, machine learning logic 120 creates rules for consolidation logic 118. For example, machine learning logic 120 may receive an override from administrative override logic 124 that deletes or changes words within a particular attribute in a record. In response, machine learning logic 120 may create and store a translation for the particular attribute that matches the change created by the override.

In an embodiment, machine learning logic 120 creates rules for selection logic 122. For example, machine learning logic 120 may receive indications from presentation/user interface logic 126 each time a transaction fails. In response to determining that transactions tend to fail more often with a particular provider, machine learning logic 120 may create a rule that prioritizes other providers over the particular provider.

In an embodiment, machine learning logic 120 may also generate rules that cause matched records to be sent to administrative computing device 150 for review. In the "twin" example above, machine learning logic 120 may create a rule that matched records that contain a record from the particular provider with the attribute "twin" are sent to administrative computing device 150 for review. In some embodiments, machine learning logic 120 creates the rule that sends matched records to administrative computing device 150 for review prior to creating stricter rules that lower confidence scores or override a particular matching.

Hardware Overview

According to one embodiment, the techniques described herein are implemented by one or more special-purpose computing devices. The special-purpose computing devices may be hard-wired to perform the techniques, or may include digital electronic devices such as one or more application-specific integrated circuits (ASICs) or field programmable gate arrays (FPGAs) that are persistently programmed to perform the techniques, or may include one or more general purpose hardware processors programmed to perform the techniques pursuant to program instructions in firmware, memory, other storage, or a combination. Such special-purpose computing devices may also combine custom hard-wired logic, ASICs, or FPGAs with custom programming to accomplish the techniques. The special-purpose computing devices may be desktop computer systems, portable computer systems, handheld devices, networking devices or any other device that incorporates hard-wired and/or program logic to implement the techniques.

Figure 7:
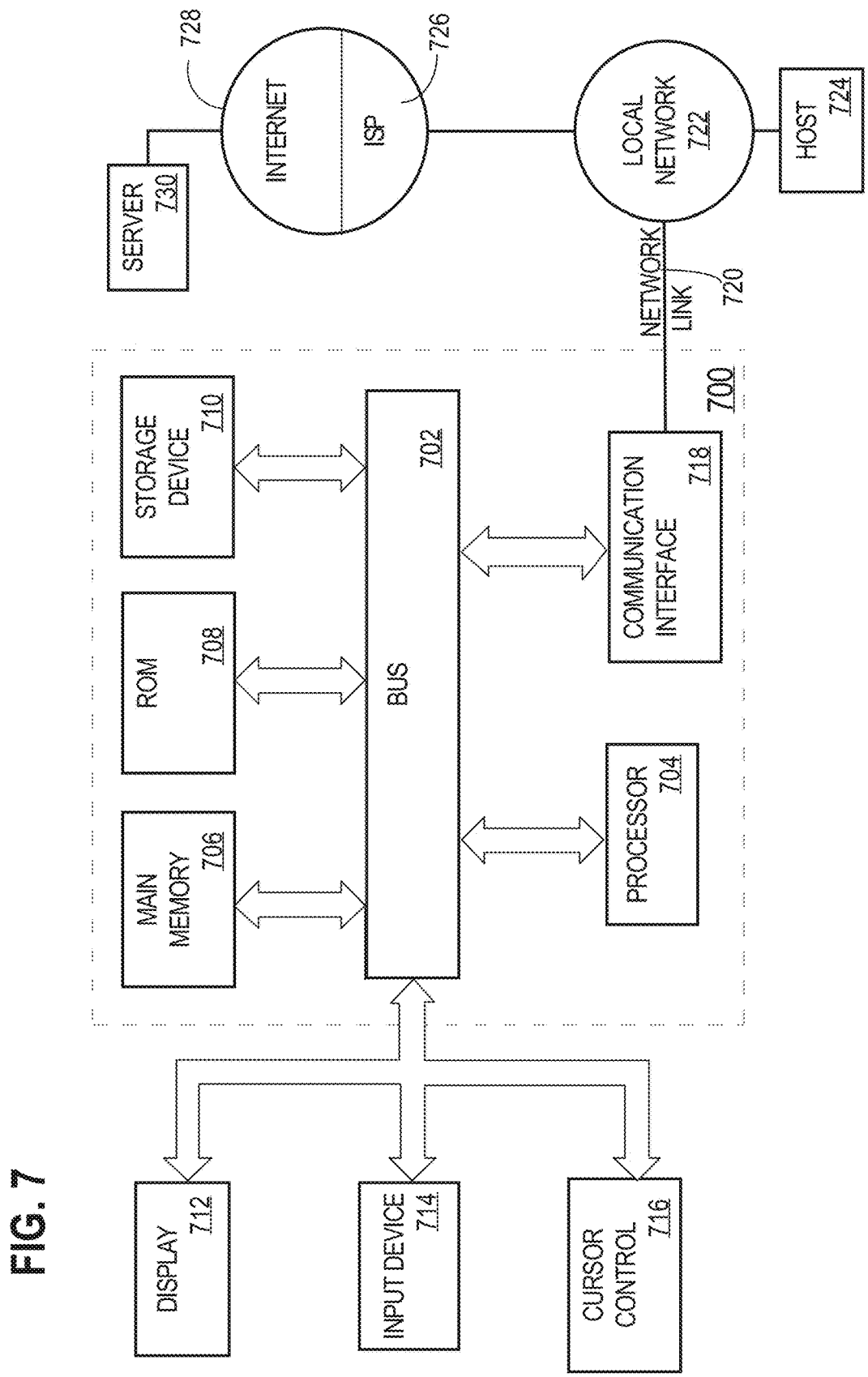
FIG. 7 illustrates a computer system upon which embodiments may be implemented.

For example, FIG. 7 is a block diagram that illustrates a computer system 700 upon which embodiments may be implemented. Computer system 700 includes a bus 702 or other communication mechanism for communicating information, and a hardware processor 704 coupled with bus 702 for processing information. Hardware processor 704 may be, for example, a general purpose microprocessor.

Computer system 700 also includes a main memory 706, such as a random access memory (RAM) or other dynamic storage device, coupled to bus 702 for storing information and instructions to be executed by processor 704. Main memory 706 also may be used for storing temporary variables or other intermediate information during execution of instructions to be executed by processor 704. Such instructions, when stored in non-transitory storage media accessible to processor 704, render computer system 700 into a special-purpose machine that is customized to perform the operations specified in the instructions.

Computer system 700 further includes a read only memory (ROM) 708 or other static storage device coupled to bus 702 for storing static information and instructions for processor 704. A storage device 710, such as a magnetic disk, optical disk, or solid-state drive is provided and coupled to bus 702 for storing information and instructions.

Computer system 700 may be coupled via bus 702 to a display 712, such as a cathode ray tube (CRT), for displaying information to a computer user. An input device 714, including alphanumeric and other keys, is coupled to bus 702 for communicating information and command selections to processor 704. Another type of user input device is cursor control 716, such as a mouse, a trackball, or cursor direction keys for communicating direction information and command selections to processor 704 and for controlling cursor movement on display 712. This input device typically has two degrees of freedom in two axes, a first axis (e.g., x) and a second axis (e.g., y), that allows the device to specify positions in a plane.

Computer system 700 may implement the techniques described herein using customized hard-wired logic, one or more ASICs or FPGAs, firmware and/or program logic which in combination with the computer system causes or programs computer system 700 to be a special-purpose machine. According to one embodiment, the techniques herein are performed by computer system 700 in response to processor 704 executing one or more sequences of one or more instructions contained in main memory 706. Such instructions may be read into main memory 706 from another storage medium, such as storage device 710. Execution of the sequences of instructions contained in main memory 706 causes processor 704 to perform the process steps described herein. In alternative embodiments, hard-wired circuitry may be used in place of or in combination with software instructions.

The term "storage media" as used herein refers to any non-transitory media that store data and/or instructions that cause a machine to operate in a specific fashion. Such storage media may comprise non-volatile media and/or volatile media. Non-volatile media includes, for example, optical disks, magnetic disks, or solid-state drives, such as storage device 710. Volatile media includes dynamic memory, such as main memory 706. Common forms of storage media include, for example, a floppy disk, a flexible disk, hard disk, solid-state drive, magnetic tape, or any other magnetic data storage medium, a CD-ROM, any other optical data storage medium, any physical medium with patterns of holes, a RAM, a PROM, and EPROM, a FLASH-EPROM, NVRAM, any other memory chip or cartridge.

Storage media is distinct from but may be used in conjunction with transmission media. Transmission media participates in transferring information between storage media. For example, transmission media includes coaxial cables, copper wire and fiber optics, including the wires that comprise bus 702. Transmission media can also take the form of acoustic or light waves, such as those generated during radio-wave and infra-red data communications.

Various forms of media may be involved in carrying one or more sequences of one or more instructions to processor 704 for execution. For example, the instructions may initially be carried on a magnetic disk or solid-state drive of a remote computer. The remote computer can load the instructions into its dynamic memory and send the instructions over a telephone line using a modem. A modem local to computer system 700 can receive the data on the telephone line and use an infra-red transmitter to convert the data to an infra-red signal. An infra-red detector can receive the data carried in the infra-red signal and appropriate circuitry can place the data on bus 702. Bus 702 carries the data to main memory 706, from which processor 704 retrieves and executes the instructions. The instructions received by main memory 706 may optionally be stored on storage device 710 either before or after execution by processor 704.

Computer system 700 also includes a communication interface 718 coupled to bus 702. Communication interface 718 provides a two-way data communication coupling to a network link 720 that is connected to a local network 722. For example, communication interface 718 may be an integrated services digital network (ISDN) card, cable modem, satellite modem, or a modem to provide a data communication connection to a corresponding type of telephone line. As another example, communication interface 718 may be a local area network (LAN) card to provide a data communication connection to a compatible LAN. Wireless links may also be implemented. In any such implementation, communication interface 718 sends and receives electrical, electromagnetic or optical signals that carry digital data streams representing various types of information.

Network link 720 typically provides data communication through one or more networks to other data devices. For example, network link 720 may provide a connection through local network 722 to a host computer 724 or to data equipment operated by an Internet Service Provider (ISP) 726. ISP 726 in turn provides data communication services through the world wide packet data communication network now commonly referred to as the "Internet" 728. Local network 722 and Internet 728 both use electrical, electromagnetic or optical signals that carry digital data streams. The signals through the various networks and the signals on network link 720 and through communication interface 718, which carry the digital data to and from computer system 700, are example forms of transmission media.

Computer system 700 can send messages and receive data, including program code, through the network(s), network link 720 and communication interface 718. In the Internet example, a server 730 might transmit a requested code for an application program through Internet 728, ISP 726, local network 722 and communication interface 718.

The received code may be executed by processor 704 as it is received, and/or stored in storage device 710, or other non-volatile storage for later execution.

In the foregoing specification, embodiments have been described with reference to numerous specific details that may vary from implementation to implementation. The specification and drawings are, accordingly, to be regarded in an illustrative rather than a restrictive sense. The sole and exclusive indicator of the scope of the disclosure, and what is intended by the applicants to be the scope of the disclosure, is the literal and equivalent scope of the set of claims that issue from this application, in the specific form in which such claims issue, including any subsequent correction.

What is claimed is:

1. A method comprising:
   receiving, from a first provider computing device of a plurality of different provider computing devices, a first record containing a first plurality of attributes that at least partly describe a particular travel item;
   receiving, from a second provider computing device of the plurality of different provider computing devices, a second record containing a second plurality of attributes;
   using digitally programmed logic of a server computing device, determining that the first record and the second record describe a same particular travel item by:

extracting the first plurality of attributes from the first record and extracting the second plurality of attributes from the second record;

determining that a first set of attributes of the first plurality of attributes corresponds to a second set of attributes of the second plurality of attributes, wherein at least a portion of the first set of attributes is different than at least a portion of the second set of attributes but at least partially describes a same particular feature of the particular travel item;

wherein determining that the first set of attributes corresponds to the second set of attributes comprises:
   accessing a custom glossary that contains a plurality of attribute variations;
   using the custom glossary, translating the portion of the first set of attributes into a form that corresponds to the portion of the second set of attributes;
   determining that the portion of the first set of attributes corresponds to the portion of the second set of attributes;

creating and storing a confidence score based, at least in part, on identifying the first set of attributes that corresponds to the second set of attributes;

determining that the confidence score exceeds a threshold value;

only when the confidence score exceeds the threshold value, creating one or more consolidated records by merging the first plurality of attributes and the second plurality of attributes and using the one or more consolidated records in operations relating to booking the particular travel item in response to communications with a user terminal.

2. The method of claim 1 wherein the first provider computing device is at a first source of hotel room data for a set of hotel rooms and the second provider computing device is at a second, different source of hotel room data for a same set of hotel rooms; wherein the first plurality of attributes and the second plurality of attributes describe hotel rooms; wherein the particular travel item is a particular hotel room type of a particular hotel property.

3. The method of claim 1, wherein extracting the first plurality of attributes from the first record comprises using the digitally programmed logic for parsing character strings in the first record to locate one or more words in the first record that match one or more stored attribute types; wherein the server computing device is further programmed to create the confidence score based, at least in part, on one or more of:
   an amount of attributes in the first set of attributes that match attributes in the second set of attributes;
   a number of words between a first word of a first attribute of the first set of attributes and a second word of the first attribute when the first attribute matches a second attribute in the second set of attributes;
   a percentage of attributes in the first plurality of attributes that match attributes in the second plurality of attributes;
   a weighting of each given attribute of the first set of attributes based on an attribute type to which the given attribute belongs.

4. The method of claim 1 wherein translating the portion of the first set of attributes into a form that corresponds to the portion of the second set of attributes includes, for a given attribute:
   accessing a term database that contains provider computing device specific attribute variations;
   identifying the given attribute in a first portion of the first set of attributes that corresponds to an entry in the term database;
   translating the given attribute into a form that corresponds to a corresponding attribute of the second set of attributes.

5. The method of claim 1 further comprising:
   receiving, at the server computing device from a managing computing device, a signal that the first record does not match the second record and an identification of a particular attribute of the first set of attributes that does not match a particular attribute in the second set of attributes;
   storing, in a provider database that contains provider computing device specific attribute variations, negative variation data that indicates that the particular attribute of the first set of attributes does not have a variation that matches the particular attribute in the second set of attributes;
   receiving, from the first provider computing device of the plurality of provider computing devices, a third record containing a third plurality of attributes;
   receiving, from a third provider computing device of the plurality of provider computing devices, a fourth record containing a fourth plurality of attributes;
   determining that a particular attribute of the third plurality of attributes does not match a particular attribute of the fourth plurality of attributes, based on the negative variation data.

6. The method of claim 1 wherein determining that the first record matches the second record further comprises:
   determining that the first record contains an insufficient amount of attributes to determine that the first record matches the second record;
   sending, over a network to the first provider computing device, a request for additional information corresponding to the first record;
   receiving, from the first provider computing device, a third plurality of attributes that correspond to the first record;
   identifying a third set of attributes of the third plurality of attributes that corresponds to the second set of attributes of the second plurality of attributes;
   wherein the server computing device further creates the confidence score based, at least in part, on identifying the third set of attributes that correspond to the second set of attributes.

7. The method of claim 1 further comprising:
   determining that one or more particular first attributes of the first plurality of attributes do not match one or more particular second attributes of the second plurality of attributes;
   wherein creating the one or more consolidated records comprises:
   creating a first consolidated record comprising the one or more particular first attributes, a set of reader friendly attributes that correspond to the first set of attributes and the second set of attributes, and one or more additional attributes of the second plurality of attributes that do not correspond to attributes of the first plurality of attributes;
   creating a second consolidated record comprising the one or more particular second attributes and a set of reader friendly attributes that correspond to the first set of attributes and the second set of attributes;
   displaying the one or more consolidated records on a consumer computing device.

8. The method of claim 7 wherein the one or more particular first attributes comprise first accepted payment methods and the one or more particular second attributes comprise second accepted payment methods, the method further comprising:
   receiving, through a graphical user interface of the consumer computing device, a selection of the first consolidated record;
   receiving, from the first provider computing device, an indication that the first provider computing device is unable to process a payment received from the consumer computing device through the first accepted payment methods;
   in response to receiving the indication from the first provider computing device, displaying the second record on the consumer computing device.

9. The method of claim 1 further comprising:
   determining that one or more particular first attributes of the first plurality of attributes do not match one or more particular second attributes of the second plurality of attributes;
   determining that the one or more particular first attributes are preferable to the one or more particular second attributes;
   wherein creating the one or more consolidated records comprises:
   creating a preferable consolidated record comprising the one or more particular first attributes, a set of reader friendly attributes that correspond to the first set of attributes and the second set of attributes, and one or more additional attributes of the second plurality of attributes that do not correspond to attributes of the first plurality of attributes;
   displaying the preferable consolidated record on a consumer computing device.

10. The method of claim 1 further comprising:
    determining that the first provider computing device is preferable to the second provider computing device;
    wherein creating the one or more consolidated records comprises:
    creating a preferable consolidated record comprising a set of reader friendly attributes that correspond to the first set of attributes and the second set of attributes and one or more additional attributes of the second plurality of attributes that do not correspond to attributes of the first plurality of attributes;
    wherein the preferable consolidated record corresponds to the first provider computing device;
    displaying the preferable consolidated record on a consumer computing device.

11. The method of claim 1 further comprising:
    receiving, from a third provider computing device of the plurality of provider computing devices, a third record containing a third plurality of attributes;
    receiving, from a fourth provider computing device of the plurality of provider computing devices, a fourth record containing a fourth plurality of attributes;
    using the digitally programmed logic of the server computing device, determining that the third record does not match the fourth record;
    receiving, from a managing computing device, a request to match the third record with the fourth record;
    creating a consolidated record from the third plurality of attributes and the fourth plurality of attributes.

12. The method of claim 1 further comprising:
    receiving, from a third provider computing device of the plurality of provider computing devices, a third record containing a third plurality of attributes;
    receiving, from a fourth provider computing device of the plurality of provider computing devices, a fourth record containing a fourth plurality of attributes;
    using the digitally programmed logic of the server computing device, determining that a first required attribute of the third plurality of attributes does not match a second required attribute of the fourth plurality of attributes;
    based on determining that the first required attribute does not match the second required attribute, determining that the third record does not match the fourth record.

13. The method of claim 1 further comprising:
    receiving, from a third provider computing device of the plurality of provider computing devices, a third record containing a third plurality of attributes;
    receiving, from a fourth provider computing device of the plurality of provider computing devices, a fourth record containing a fourth plurality of attributes;
    using the digitally programmed logic of the server computing device, determining that a first numerical attribute of the third plurality of attributes exceeds a second numerical attribute of the fourth plurality of attributes by a value greater than a specified threshold value;
    based on determining that the first numerical attribute exceeds the second numerical attribute by a value greater than the specified threshold, determining that the third record does not match the fourth record.

14. One or more non-transitory computer readable media storing instructions which, when executed by one or more processors, cause performance of:
    receiving, from a first provider computing device of a plurality of different provider computing devices, a first record containing a first plurality of attributes that at least partly describe a particular travel item;
    receiving, from a second provider computing device of the plurality of different provider computing devices, a second record containing a second plurality of attributes;
    using digitally programmed logic of a server computing device, determining that the first record and the second record describe a same particular travel item by:
    extracting the first plurality of attributes from the first record and extracting the second plurality of attributes from the second record;
    determining that a first set of attributes of the first plurality of attributes corresponds to a second set of attributes of the second plurality of attributes, wherein at least a portion of the first set of attributes is different than at least a portion of the second set of attributes but at least partially describes a same particular feature of the particular travel item;
    wherein determining that the first set of attributes corresponds to the second set of attributes comprises:
       accessing a custom glossary that contains a plurality of attribute variations;
       using the custom glossary, translating the portion of the first set of attributes into a form that corresponds to the portion of the second set of attributes;
       determining that the portion of the first set of attributes corresponds to the portion of the second set of attributes;
    creating and storing a confidence score based, at least in part, on identifying the first set of attributes that corresponds to the second set of attributes;

determining that the confidence score exceeds a threshold value;

only when the confidence score exceeds the threshold value, creating one or more consolidated records by merging the first plurality of attributes and the second plurality of attributes and using the one or more consolidated records in operations relating to booking the particular travel item in response to communications with a user terminal.

15. The one or more non-transitory computer readable media of claim 14, wherein the first provider computing device is at a first source of hotel room data for a set of hotel rooms and the second provider computing device is at a second, different source of hotel room data for a same set of hotel rooms; wherein the first plurality of attributes and the second plurality of attributes describe hotel rooms; wherein the particular travel item is a particular hotel room type of a particular hotel property.

16. The one or more non-transitory computer readable media of claim 14, wherein extracting the first plurality of attributes from the first record comprises using the digitally programmed logic for parsing character strings in the first record to locate one or more words in the first record that match one or more stored attribute types; wherein the server computing device is further programmed to create the confidence score based, at least in part, on one or more of:
   an amount of attributes in the first set of attributes that match attributes in the second set of attributes;
   a number of words between a first word of a first attribute of the first set of attributes and a second word of the first attribute when the first attribute matches a second attribute in the second set of attributes;
   a percentage of attributes in the first plurality of attributes that match attributes in the second plurality of attributes;
   a weighting of each given attribute of the first set of attributes based on an attribute type to which the given attribute belongs.

17. The one or more non-transitory computer readable media of claim 14 wherein translating the portion of the first set of attributes into a form that corresponds to the portion of the second set of attributes includes, for a given attribute:
   accessing a term database that contains provider computing device specific attribute variations;
   identifying the given attribute in a first portion of the first set of attributes that corresponds to an entry in the term database;
   translating the given attribute into a form that corresponds to a corresponding attribute of the second set of attributes.

18. The one or more non-transitory computer readable media of claim 14 wherein the instructions, when executed by the one or more processors, further cause:
   receiving, at the server computing device from a managing computing device, a signal that the first record does not match the second record and an identification of a particular attribute of the first set of attributes that does not match a particular attribute in the second set of attributes;
   storing, in a provider database that contains provider computing device specific attribute variations, negative variation data that indicates that the particular attribute of the first set of attributes does not have a variation that matches the particular attribute in the second set of attributes;
   receiving, from the first provider computing device of the plurality of provider computing devices, a third record containing a third plurality of attributes;
   receiving, from a third provider computing device of the plurality of provider computing devices, a fourth record containing a fourth plurality of attributes;
   determining that a particular attribute of the third plurality of attributes does not match a particular attribute of the fourth plurality of attributes, based on the negative variation data.

19. The one or more non-transitory computer readable media of claim 14 wherein determining that the first record matches the second record further comprises:
   determining that the first record contains an insufficient amount of attributes to determine that the first record matches the second record;
   sending, over a network to the first provider computing device, a request for additional information corresponding to the first record;
   receiving, from the first provider computing device, a third plurality of attributes that correspond to the first record;
   identifying a third set of attributes of the third plurality of attributes that corresponds to the second set of attributes of the second plurality of attributes;
   wherein the server computing device further creates the confidence score based, at least in part, on identifying the third set of attributes that correspond to the second set of attributes.

20. The one or more non-transitory computer readable media of claim 14 wherein the instructions, when executed by the one or more processors, further cause:
   determining that one or more particular first attributes of the first plurality of attributes do not match one or more particular second attributes of the second plurality of attributes;
   wherein creating the one or more consolidated records comprises:
   creating a first consolidated record comprising the one or more particular first attributes, a set of reader friendly attributes that correspond to the first set of attributes and the second set of attributes, and one or more additional attributes of the second plurality of attributes that do not correspond to attributes of the first plurality of attributes;
   creating a second consolidated record comprising the one or more particular second attributes and a set of reader friendly attributes that correspond to the first set of attributes and the second set of attributes;
   displaying the one or more consolidated records on a consumer computing device.

21. The one or more non-transitory computer readable media of claim 20 wherein the one or more particular first attributes comprise first accepted payment methods and the one or more particular second attributes comprise second accepted payment methods, the method further comprising:
   receiving, through a graphical user interface of the consumer computing device, a selection of the first consolidated record;
   receiving, from the first provider computing device, an indication that the first provider computing device is unable to process a payment received from the consumer computing device through the first accepted payment methods;
   in response to receiving the indication from the first provider computing device, displaying the second record on the consumer computing device.

22. The one or more non-transitory computer readable media of claim 14 wherein the instructions, when executed by the one or more processors, further cause:
- determining that one or more particular first attributes of the first plurality of attributes do not match one or more particular second attributes of the second plurality of attributes;
- determining that the one or more particular first attributes are preferable to the one or more particular second attributes;
- wherein creating the one or more consolidated records comprises:
- creating a preferable consolidated record comprising the one or more particular first attributes, a set of reader friendly attributes that correspond to the first set of attributes and the second set of attributes, and one or more additional attributes of the second plurality of attributes that do not correspond to attributes of the first plurality of attributes;
- displaying the preferable consolidated record on a consumer computing device.

23. The one or more non-transitory computer readable media of claim 14 wherein the instructions, when executed by the one or more processors, further cause:
- determining that the first provider computing device is preferable to the second provider computing device;
- wherein creating the one or more consolidated records comprises:
- creating a preferable consolidated record comprising a set of reader friendly attributes that correspond to the first set of attributes and the second set of attributes and one or more additional attributes of the second plurality of attributes that do not correspond to attributes of the first plurality of attributes;
- wherein the preferable consolidated record corresponds to the first provider computing device;
- displaying the preferable consolidated record on a consumer computing device.

24. The one or more non-transitory computer readable media of claim 14 wherein the instructions, when executed by the one or more processors, further cause:
- receiving, from a third provider computing device of the plurality of provider computing devices, a third record containing a third plurality of attributes;
- receiving, from a fourth provider computing device of the plurality of provider computing devices, a fourth record containing a fourth plurality of attributes;
- using the digitally programmed logic of the server computing device, determining that the third record does not match the fourth record;
- receiving, from a managing computing device, a request to match the third record with the fourth record;
- creating a consolidated record from the third plurality of attributes and the fourth plurality of attributes.

25. The one or more non-transitory computer readable media of claim 14 wherein the instructions, when executed by the one or more processors, further cause:
- receiving, from a third provider computing device of the plurality of provider computing devices, a third record containing a third plurality of attributes;
- receiving, from a fourth provider computing device of the plurality of provider computing devices, a fourth record containing a fourth plurality of attributes;
- using the digitally programmed logic of the server computing device, determining that a first required attribute of the third plurality of attributes does not match a second required attribute of the fourth plurality of attributes;
- based on determining that the first required attribute does not match the second required attribute, determining that the third record does not match the fourth record.

26. The one or more non-transitory computer readable media of claim 14 wherein the instructions, when executed by the one or more processors, further cause:
- receiving, from a third provider computing device of the plurality of provider computing devices, a third record containing a third plurality of attributes;
- receiving, from a fourth provider computing device of the plurality of provider computing devices, a fourth record containing a fourth plurality of attributes;
- using the digitally programmed logic of the server computing device, determining that a first numerical attribute of the third plurality of attributes exceeds a second numerical attribute of the fourth plurality of attributes by a value greater than a specified threshold value;
- based on determining that the first numerical attribute exceeds the second numerical attribute by a value greater than the specified threshold, determining that the third record does not match the fourth record.

* * * * *